US009740412B2

(12) United States Patent
Jung et al.

(10) Patent No.: US 9,740,412 B2
(45) Date of Patent: Aug. 22, 2017

(54) RECEPTACLES FOR MEMORY DEVICES AND METHODS OF OPERATION THEREOF

(71) Applicant: Samsung Electronics Co., Ltd., Gyeonggi-do (KR)

(72) Inventors: Won Suk Jung, Gyeongsangbuk-do (KR); Myeong Joon Kang, Gyeonggi-do (KR); Tae Young Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 68 days.

(21) Appl. No.: 14/735,274

(22) Filed: Jun. 10, 2015

(65) Prior Publication Data
US 2015/0363121 A1    Dec. 17, 2015

(30) Foreign Application Priority Data
Jun. 12, 2014    (KR) .................. 10-2014-0071442

(51) Int. Cl.
| G06F 12/00 | (2006.01) |
| G06F 3/06 | (2006.01) |
| H01R 13/703 | (2006.01) |
| G06F 13/40 | (2006.01) |
| G06F 13/42 | (2006.01) |

(52) U.S. Cl.
CPC .......... *G06F 3/0617* (2013.01); *G06F 3/0653* (2013.01); *G06F 3/0673* (2013.01); *G06F 13/4068* (2013.01); *G06F 13/4243* (2013.01); *H01R 13/703* (2013.01)

(58) Field of Classification Search
CPC .............. G06F 3/0617; G06F 13/4068; G06F 13/4243; G06F 3/0673; G06F 3/0653; H01R 13/703
See application file for complete search history.

(56) References Cited

U.S. PATENT DOCUMENTS

| 5,887,145 A | * | 3/1999 | Harari | G06F 13/4068 710/13 |
| 6,425,061 B1 | * | 7/2002 | Kaise | H04H 20/81 348/E7.037 |
| 6,454,164 B1 | * | 9/2002 | Wakabayashi | G06K 7/0021 235/379 |
| 6,512,731 B1 | | 1/2003 | Seo et al. | |
| 6,568,960 B2 | | 5/2003 | Bricaud et al. | |
| 7,508,776 B2 | | 3/2009 | Lin et al. | |
| 7,996,613 B2 | * | 8/2011 | Wang | G06F 13/4234 711/115 |
| 8,070,067 B2 | | 12/2011 | Liu | |

(Continued)

FOREIGN PATENT DOCUMENTS

| CN | 1259731 A | 7/2000 |
| CN | 1318173 A | 10/2001 |

(Continued)

OTHER PUBLICATIONS

Chinese Office Action dated Feb. 27, 2017.

Primary Examiner — John A Lane
(74) Attorney, Agent, or Firm — Cha & Reiter, LLC

(57) ABSTRACT

An interface is provided comprising: a receptacle arranged to receive a memory device; and a detection signal line arranged to transmit an electrical signal identifying a type of the memory device.

11 Claims, 12 Drawing Sheets

(56) References Cited

U.S. PATENT DOCUMENTS

| | | | |
|---|---|---|---|
| 8,296,491 B2* | 10/2012 | Pinto | G06F 13/409 710/16 |
| 8,301,822 B2 | 10/2012 | Pinto et al. | |
| 8,332,584 B2* | 12/2012 | Wang | G06F 3/0679 711/115 |
| 2001/0010984 A1 | 8/2001 | Bricaud et al. | |
| 2002/0179706 A1* | 12/2002 | Nishigata | G06K 7/0069 235/441 |
| 2003/0154326 A1* | 8/2003 | Tseng | G06F 1/1632 710/1 |
| 2005/0036397 A1 | 2/2005 | Yeh et al. | |
| 2005/0036453 A1 | 2/2005 | Lin et al. | |
| 2005/0038956 A1* | 2/2005 | Yeh | G06F 3/061 711/103 |
| 2005/0039174 A1 | 2/2005 | Liu et al. | |
| 2005/0255730 A1 | 11/2005 | Oh | |
| 2007/0168614 A1 | 7/2007 | Luo et al. | |
| 2008/0076301 A1 | 3/2008 | Liu | |
| 2010/0125689 A1* | 5/2010 | Chang | G06F 13/387 710/301 |
| 2010/0131707 A1* | 5/2010 | Chi | G06F 13/385 711/115 |
| 2010/0205341 A1* | 8/2010 | Chen | G06F 13/385 710/301 |
| 2011/0016248 A1* | 1/2011 | Takahashi | G06F 13/4081 710/301 |
| 2011/0026213 A1 | 2/2011 | Chang et al. | |
| 2011/0072185 A1 | 3/2011 | Pinto et al. | |
| 2012/0001763 A1* | 1/2012 | Billick | G06F 15/177 340/635 |
| 2012/0315781 A1* | 12/2012 | Little | G06K 13/0825 439/345 |
| 2013/0288535 A1 | 10/2013 | You et al. | |
| 2015/0006804 A1* | 1/2015 | Bress | G11O 5/148 711/104 |
| 2015/0356040 A1* | 12/2015 | Shin | G06F 13/4022 711/103 |

FOREIGN PATENT DOCUMENTS

| | | | |
|---|---|---|---|
| CN | 1514332 A | 7/2004 | |
| CN | 101377765 A | 3/2009 | |
| CN | 201945991 U | 8/2011 | |
| CN | 202084687 U | 12/2011 | |
| CN | 102576339 A | 7/2012 | |
| CN | 202601962 A | 12/2012 | |
| CN | 103036117 A | 4/2013 | |
| TW | EP 2037372 A2 * | 3/2009 | G06F 13/409 |

* cited by examiner

US 9,740,412 B2

RECEPTACLES FOR MEMORY DEVICES AND METHODS OF OPERATION THEREOF

CLAIM OF PRIORITY

This application claims the benefit under 35 U.S.C. §119(a) of a Korean patent application filed on Jun. 12, 2014 in the Korean Intellectual Property Office and assigned Serial number 10-2014-0071442, the entire disclosure of which is hereby incorporated by reference.

TECHNICAL FIELD

The present disclosure relates to electronic devices, and more particularly to an interface for connecting hardware components.

BACKGROUND

An electronic device with a sound playing function and/or a communication function is being used by a wide variety of people. The electronic device includes a memory device for storing data associated with execution of such a function. Advances in technology allow the memory device to have an ever-increasing capacity to store more data in a less size.

Meanwhile, conventional memory devices are being manufactured and sold by various manufacturers. The conventional memory devices may be different from each other in terms of the shape of a portion to be inserted in an electronic device. Accordingly, even if a memory device is inserted in an electronic device, the electronic device may fail to normally recognize the inserted memory device.

SUMMARY

According to aspects of the disclosure, an interface is provided comprising: a receptacle arranged to receive a memory device; and a detection signal line arranged to transmit an electrical signal identifying a type of the memory device.

According to aspects of the disclosure, an electronic device is provided comprising: a controller; and an interface configured to feed to the controller an electrical signal identifying a type of a memory device that is inserted in the interface, wherein the controller is configured to identify the type of the memory device based on the signal.

According to aspects of the disclosure, a method for operating an electronic device is provided, comprising: receiving a plurality of electrical signals from an interface; identifying a type of a memory device that is placed in the interface based on at least one of the signals; and controlling an operation of the memory device in accordance with the type of the memory device.

BRIEF DESCRIPTION OF THE DRAWINGS

The above and other embodiments, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
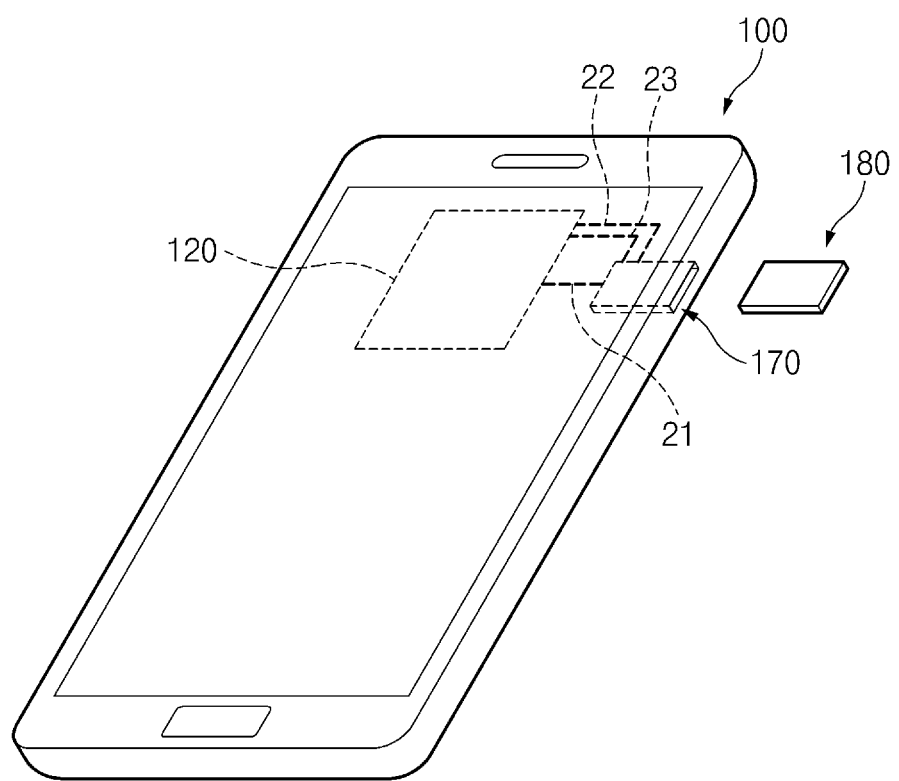
FIG. 1 is a diagram of an example of an electronic device, according to an embodiment of the present disclosure.

Hereinafter, the present disclosure is described with reference to the accompanying drawings. Various modifications are possible in various embodiments of the present disclosure, and thus, some exemplary embodiments are illustrated in drawings and are described in the following specification. However, this is not intended to limit the scope of the present disclosure to such exemplary embodiments, and it should be construed that the present disclosure covers modifications and variations of this disclosure within the scope of the appended claims and their equivalents. With respect to the descriptions of the drawings, like reference numerals refer to like elements.

Hereinafter, electronic devices according to various embodiments will be described with reference to the accompanying drawings. The term "user" used herein may refer to a person who uses an electronic device or may refer to a device (e.g., an artificial electronic device) that uses an electronic device.

FIG. 1 is a diagram of an example of an electronic device, according to an embodiment of the present disclosure. Referring to FIG. 1, an electronic device 100 may include an interface 170 for insertion and extraction of a memory device 180 (e.g., an external memory card or the like), a host controller 120 electrically connected to the interface 170, and a display 150 displaying information associated with the operation of the memory device 180. Additionally or alternatively, the electronic device 100 may further include an input/output interface, a communication interface, a memory (e.g., internal memory), and the like. Also, the electronic device 100 may include signal lines, for example, a power/data signal line 21 for connecting the interface 170 to the host controller 120, a detection signal line 22, and a detection signal line 23 for recognizing a type of the memory device 180. The power/data signal line 21 may be disposed in plural.

The interface 170 may be disposed in the form of a specific-sized slot, allowing the memory device 180 to be inserted therein or extracted therefrom. According to an embodiment of the present disclosure, the interface 170 may be provided to have a structure of a specific-sized slot, which may be perforated inwardly from a side portion of the electronic device 100. In various embodiments of the present disclosure, the interface 170 may be disposed at a portion of a rear surface of the electronic device 100. Alternatively, the interface 170 may be disposed at a portion of a rear cover of the electronic device 100 and may not be exposed to the outside, due to the presence of a battery cover provided thereon. The interface 170 may have a size corresponding to that of the memory device 180. According to an embodiment of the present disclosure, in the case where the memory device 180 has a rectangular shape, the interface 170 may also have a rectangular shape similar to that of the memory device 180.

At least one signal terminal may be disposed in the interface 170, and it may be formed of a conductive material (e.g., at least one of metallic materials or materials with electric conductivity higher than a predetermined value) through which electrical signals is transmitted and received. One end of the signal terminal may be electrically connected to contact terminals of the memory device 180. The other end of the signal terminal may be connected to at least one of the signal lines (e.g., the power/data signal line 21, the detection signal line 22, the detection signal line 23, and so forth) connected to the host controller 120. The at least one signal terminal may transfer a power signal, a data signal, and the like between the host controller 120 and the memory device 180. In various embodiments, the signal terminal disposed in the interface 170 may be used as a detection terminal for recognizing a type of the memory device 180. The detection terminal may be connected to the host controller 120 through the detection signal line 23 (e.g., interrupt signal line).

At least one switch unit may be disposed in the interface 170. A physical or electric state of the at least one switch unit may be changed depending on whether the memory device 180 is inserted or not. For example, the switch unit may have a state (e.g., a switch-on state) in which two terminals are physically or electrically separated from each other when the memory device 180 is inserted. The switch unit may have a state (e.g., a switch-off state) in which the two terminals are physically or electrically disconnected from each other. In various embodiments, a plurality of switch units may be disposed in the interface 170. An on state or an off state of at least one of the plurality of switch units may vary with a shape of the memory device 180 inserted. Also, a specific switch of the plurality of switch units may maintain an on state or an off state, depending on a shape of the memory device 180. The switch unit disposed in the interface 170 may be connected to the detection signal line 22. Alternatively, the plurality of switch units formed (or disposed) in the interface 170 may be connected to at least one of the detection signal line 22 and the detection signal line 23.

In various embodiments of the present disclosure, the interface 170 may be classified as a push-push type or a push-pull type, based on an insertion/extraction way of the memory device 180 to be inserted. For the push-push type, the memory device 180 may be inserted into an opening of the interface 170 and may be extracted from the interface 170 by pushing the memory device 180 in an insertion direction. For the push-pull type, the memory device 180 may be extracted from the interface 170 by applying a force to the memory device 180 in a direction opposite to the insertion direction. Depending on an insertion/extraction way of the memory device 180, the interface 170 may recognize the type of the memory device 180 using the plurality of switch units or at least one detection terminal.

According to an embodiment of the present disclosure, in instances in which the interface 170 is of the push-pull type, the interface 170 may have at least one of a structure in which a plurality of switch units is disposed, a structure in which at least one detection terminal is disposed, or a structure in which a detection terminal and a switch unit are disposed. According to an embodiment of the present disclosure, in instances in which the interface 170 is of the push-push type, the interface 170 may include at least one detection terminal with regard to recognition of the insertion and extraction of the memory device 180.

The host controller 120 may perform a function of the electronic device 100 or run an application of the electronic device 100. The host controller 120 may include any suitable type of processing circuitry. For example, the host controller may include one or more of an application processor, a communication processor, a Field-Programmable Gate Array (FPGA), an Application-Specific Integrated Circuit (ASIC), a Digital Signal Processor (DSP), etc. According to an embodiment of the present disclosure, the host controller 120 may be electrically connected to the interface 170 through signal lines. If a specific type of the memory device 180 is inserted into the interface 170, the host controller 120 may recognize the type of the inserted memory device 180 and initialize and manage the memory device based on a signal that is received from the interface 170.

According to an embodiment of the present disclosure, if an SD card (or an ultra-high speed-I (UHS-I) type memory device) is inserted into the interface 170, the host controller 120 may control an operation of transmitting and receiving data using a first-type data communication method, based on a given setting. If a universal flash storage (UFS) card is inserted into the interface 170, the host controller 120 may control an operation of transmitting and receiving data using a second-type data communication method, based on a given setting. The host controller 120 may adjust a level of power to the memory device 180 through the interface 170, based on the type of the memory device 180 inserted into the interface 170. Alternatively, under a control of the host controller 120, a plurality of signals having different voltage levels may be supplied to the memory device 180 through the interface 170, depending on the type of the memory device 180.

The display 150 may display information on operations of the electronic device 100. For example, the display 150 may output a lock-setting screen, an idle screen, a menu screen, and a specific function or application execution screen of the electronic device 100. According to an embodiment of the present disclosure, the display 150 may output at least one of information on insertion or extraction of the memory device 180, information on the type of the memory device 180, information on initialization of the memory device 180, or in stored in the memory device 180 to the interface 170. Also, the display 150 may output information on whether the memory device 180 is normally recognized or whether an error occurs in recognizing the memory device 180. The outputting of the above information may be omitted in accordance with a setting of the display 150.

The power/data signal line 21 may include at least one line connecting the interface 170 to the host controller 120. According to an embodiment of the present disclosure, the power/data signal line 21 may include at least one power signal line (e.g., at least one signal line for transmitting electric power with at least one reference voltage) for transmitting power of the electronic device 100 to the interface 170. Also, the power/data signal line 21 may include at least one of a data transmitting signal line for transmitting a control signal or a data signal from the host controller 120 to the interface 170 and a data receiving signal line for transmitting a data signal of the memory device 180 inserted in the interface 170 to the host controller 120. Also, the power/data signal line 21 may include at least one clock signal line for transferring a reference clock signal from the host controller 120.

The detection signal line 22 may be connected to a switch unit for detecting whether an external memory device is inserted in the interface 170 (e.g., a switch whose physical or electric state is changed when an external memory device 180 is inserted). The switch unit may be disposed in the interface 170. The other end of the detection signal line 22 may be connected to the host controller 120 (e.g., to an interrupt port of the host controller). According to an embodiment of the present disclosure, the detection signal line 22 may be used to detect whether the external memory device 180 is inserted in or extracted from the interface 170, regardless of the type of the external memory device 180.

The detection signal line 23 may be connected to a switch unit that is used to detect the type of the memory device 180 when the memory device 180 is inserted into the interface 170. The detection signal line 23 may be disposed at a position different from that of the detection signal line 22. Accordingly, the detection signal line 23 may transmit a first signal (e.g., a detection signal having the same electric state as a previous electric state of a switch unit) to the host controller 120 (e.g., an interrupt port different from a port connected to the detection signal line 22) or a second signal (a detection signal having an electric state different from the previous electric state of the switch unit) thereto.

In various embodiments of the present disclosure, the detection signal line 23 may be connected to a detection terminal. A contact terminal corresponding to the detection terminal may be disposed only in a specific external device. As an example, for a secure digital (SD) memory device, it is impossible to dispose a contact terminal which electrically contacts with detection terminal. By contrast, a contact terminal for such electric connection with the detection terminal may be disposed in a universal flash storage (UFS) memory device. Accordingly, if a first-type external device (e.g., an SD memory device) is inserted into the interface 170, the detection signal line 23 may transmit a detection signal, whose electric state is the same as a previous electric state, to the host controller 120. If a second-type external device (e.g., an UFS memory device) is inserted into the interface 170, the detection signal line 23 may transmit a detection signal, whose electric state is different from a previous electric state, to the host controller 120.

In various embodiments of the present disclosure, a pull-up resistor may be disposed on at least one of the detection signal line 22 or the detection signal line 23. Accordingly, a transmission signal being transmitted to the host controller 120 (e.g., the host controller 120 connected to the detection signal line 22 or the detection signal line 23) may be maintained or changed, depending on a state of the switch unit connected to the detection signal line 22 or the detection signal line 23 or on a change in a physical or electric state of the detection terminal (e.g., a change to a ground state).

Figure 2:
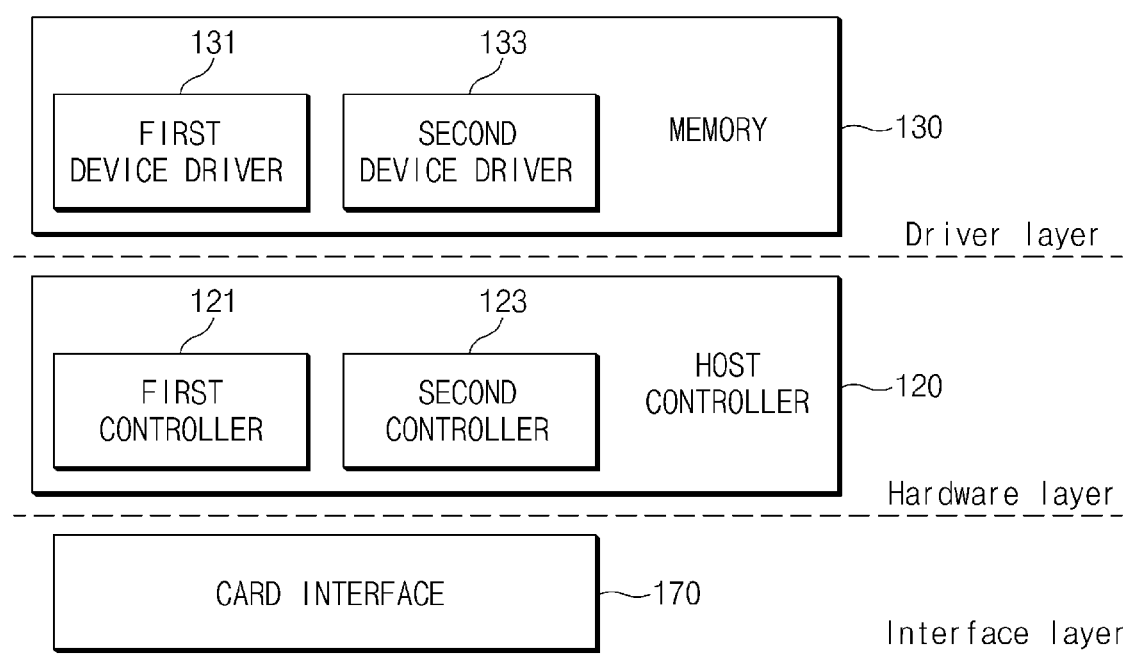
FIG. 2 is a block diagram of an example of an electronic device, according to an embodiment of the present disclosure.

FIG. 2 is a block diagram of an example of an electronic device, according to an embodiment of the present disclosure. Referring to FIG. 2, the electronic device may be organized in an interface layer, a hardware layer, and a driver layer. Accordingly, the electronic device 100 may be a structure in which the host controller 120 is disposed on the interface 170 and a memory 130 is disposed on the host controller 120. Here, arrangement of components may not be limited to physical arrangement and may be understood as a structure for memory interfacing of the interface 170.

The interface 170 may be configured in the same or similar manner as that described with reference to FIG. 1. For example, the interface 170 may be a specific-sized slot formed such that a specific type of the memory device 180 is inserted or detachable. The interface 170 may include at least one signal terminal and at least one detection terminal. Also, the interface 170 may include at least one switch unit connected to the detection signal line. If the memory device 180 is inserted, the interface 170 may transmit an interrupt signal (e.g., an electrical signal according to an operation of the switch unit) associated with the insertion to the host controller 120.

Upon receiving the signal, the host controller 120 may perform a process associated to the control of the memory device 180. For example, the host controller 120 may detect the type of the memory device 180 and perform an initialization process corresponding to the detected type. After or during the initialization process, the host controller 120 may process a communication control in accordance with the type of the memory device 180. In the case where the memory device 180 is extracted, the host controller 120 may retrieve an allocated resource.

The host controller 120 may include a first controller 121 and a second controller 123 with regard to processing a plurality of memory devices 180 which are of different types. In the case where a first-type memory device is inserted, the first controller 121 may support power supplying, initializing, and data transmitting and receiving processing of the first-type memory device. In the case where a second-type memory device is inserted, the second controller 123 may support power supplying, initializing, or data transmitting and receiving processing of the second-type memory device.

According to an embodiment of the present disclosure, in the case where a first-type memory device (e.g., SD card) is inserted in the interface 170, the host controller 120 may load from memory (130) and/or activate a first device driver 131 associated with an operation of the first controller 121. For example, based on at least one of the signals received over the signal line 22 and the detection signal line 23, the host controller 120 may determine that the first-type memory device is inserted in the interface 170. Alternatively, when receiving a signal indicating a change in an electric state of the switch through the detection signal line 22 and a signal having a state the same as or similar to a previous electric state through the detection terminal, the host controller 120 may determine that the first-type memory device is inserted in the interface 170. In this case, the host controller 120 may load the first device driver 131 in the memory 130 or may activate the memory 130. The first device driver 131 may communicate with the first-type memory device disposed in the interface 170 through the first controller 121.

According to an embodiment of the present disclosure, in instances in which a second-type memory device (e.g., UFS card) is inserted in the interface 170, the host controller 120 may activate a second device driver 133 associated with an operation of the second controller 123. For example, when receiving a signal indicating a change in an electric state of the switch through the detection signal line 22 and a signal indicating maintenance of in an electric state of the switch through the detection signal line 23, the host controller 120 may determine that the second-type memory device is inserted in the interface 170. Alternatively, when receiving a signal indicating a change in an electric state of the switch through the detection signal line 22 and a signal having a state different from a previous electric state through the detection terminal, the host controller 120 may determine that the second-type memory device is inserted in the interface 170. In this case, the host controller 120 may load from memory and/or activate the second device driver 133. The second device driver 133 may communicate with the second-type memory device disposed in the interface 170 through the second controller 123.

In some implementations, the host controller 120 may transmit the signal, which is transmitted through the detection signal line 22 and is associated with the electric state of the switch, and the signal, which is transmitted through the detection signal line 23 or the detection terminal, to the first device driver 131. The host controller 120 may transmit the signal, which is transmitted through the detection signal line 23 or the detection terminal, to the second device driver 133.

The memory 130 may include the first device driver 131 and the second device driver 133. The first device driver 131 may be activated or deactivated, in response to a signal, which is transmitted from the host controller 120 and is associated with a switch state. For example, if the signal associated with a change in the state of the switch (hereinafter referred to as a switch-state signal) is received through the detection signal line 22, the first device driver 131 may detect a switch-state signal of the detection signal line 23. If the switch-state signal of the detection signal line 23 is changed, the first device driver 131 may initialize and/or operate the external memory card, which is inserted in the interface 170, using the first controller 121. In the case where the electrical signal of the detection signal line 23 is equivalent or similar to that of the previous switch state, the first device driver 131 may stop the operations of the first controller 121. The first device driver 131 may be deactivated or removed from the memory 130. According to an embodiment of the present disclosure, the second device driver 133 may receive a signal associated with a previous electric state of the detection signal line 23 from the host controller 120 or receive a specific signal from the detection terminal. In this case, the second device driver 133 may perform several operations (e.g., an initialization or data transmission/receipt) on the memory device inserted in the interface 170 using the second controller 123. If the memory device is extracted from the interface 170, the first device driver 131 or the second device driver 133 loaded in the memory 130 may be deactivated or removed from the memory 130 under a control of the host controller 120.

As described above, in various embodiments of the present disclosure, the disclosed interface may include a receptacle (or body) in which a memory device can be inserted, and a detection signal line configured to transmit an electrical signal associated with and dependent on a type of the memory device.

In various embodiments of the present disclosure, the interface may further include a switch unit disposed at a portion of the receptacle, and an electric state of the switch unit may be changed when the memory device is inserted.

In various embodiments of the present disclosure, the interface may further include at least one signal terminals electrically connected to contact terminals disposed in the memory device.

In various embodiments of the present disclosure, the signal terminals may further include a detection terminal which is connected to the detection signal line and whose electric state is changed or maintained depending on the type of the memory device.

In various embodiments of the present disclosure, the interface may further include a switch unit, which is connected to the detection signal line, and whose electric state is changed or maintained depending on the type of the memory device.

In various embodiments of the present disclosure, the switch unit may be disposed at a position, where the switch unit is in contact with at least a portion of a first type memory device to be inserted or is in non-contact with a second type memory device to be inserted.

In various embodiments of the present disclosure, the interface may further include an insertion/extraction supporting device which is disposed at a portion of the receptacle and is moved by insertion of the memory device. In this case, the switch unit may be disposed in such a way that at least a portion thereof is veiled by the insertion/extraction supporting device.

In various embodiments of the present disclosure, the switch unit may be at least partially exposed by movement of the insertion/extraction supporting device to have a changed electric state or may be in contact with a to-be-inserted memory device to maintain a previous electric state.

In various embodiments of the present disclosure, the electronic device may include an interface transmitting an electrical signal whose state is changed depending on a type of a memory device to be inserted and a host controller determining the type of the memory device, based on the electrical signal.

In various embodiments of the present disclosure, the interface may further include a first switch unit which is provided at a portion of the receptacle and is configured in such a way that an electric state thereof is changed when the memory device is inserted, and a detection signal line transmitting the electrical signal. The electronic device may further include at least one of a detection terminal which is connected to the detection signal line and whose electric state is changed or maintained depending on the type of the memory device or a second switch unit which is connected to the detection signal line and whose electric state is changed or maintained depending on the type of the memory device. Here, the detection terminal may be one of at least one signal terminals electrically connected to contact terminals disposed in the memory device.

In various embodiments of the present disclosure, the second switch unit may be disposed at a position where the second switch unit is in contact with at least a portion of a to-be-inserted memory device with a specific shape or is in non-contact with another to-be-inserted memory device with a different shape.

In various embodiments of the present disclosure, the electronic device may further include an insertion/extraction supporting device disposed at a portion of the receptacle to be movable by insertion of the memory device. The second switch unit may be disposed in such a way that at least a portion thereof is veiled by the insertion/extraction supporting device.

In various embodiments of the present disclosure, the second switch unit may be at least partially exposed by movement of the insertion/extraction supporting device to have a changed electric state or may be in contact with a to-be-inserted memory device to maintain a previous electric state.

In various embodiments of the present disclosure, the electronic device may further include a memory storing at least one device driver which supports an operation corresponding to each type of the memory device and is activated or deactivated based on an electric state of the detection terminal or the second switch unit.

In various embodiments of the present disclosure, the device driver may include at least one of a first device driver or a second device driver. Here, the first device driver may be activated in accordance with an electric state changed by insertion of the memory device and may be maintained in an activated state or may be deactivated, based on an electric state of the detection terminal or the second switch unit. The second device driver may be activated or may be maintained in a deactivated state, based on the electric state of the detection terminal or the second switch unit.

In various embodiments of the present disclosure, the disclosed interface may comprise a receptacle in which a memory device is inserted and a detection signal line configured to transmit an electrical signal associated with a type of the memory device, wherein the detection signal line transmits distinguishable electrical signal according to the type of the memory device.

In various embodiments of the present disclosure, an electronic device may comprise an interface configured to transmit a distinguishable electrical signal according to a type of a memory device to be inserted and a host controller configured to determine the type of the memory device, based on the distinguishable electrical signal.

Figure 3:
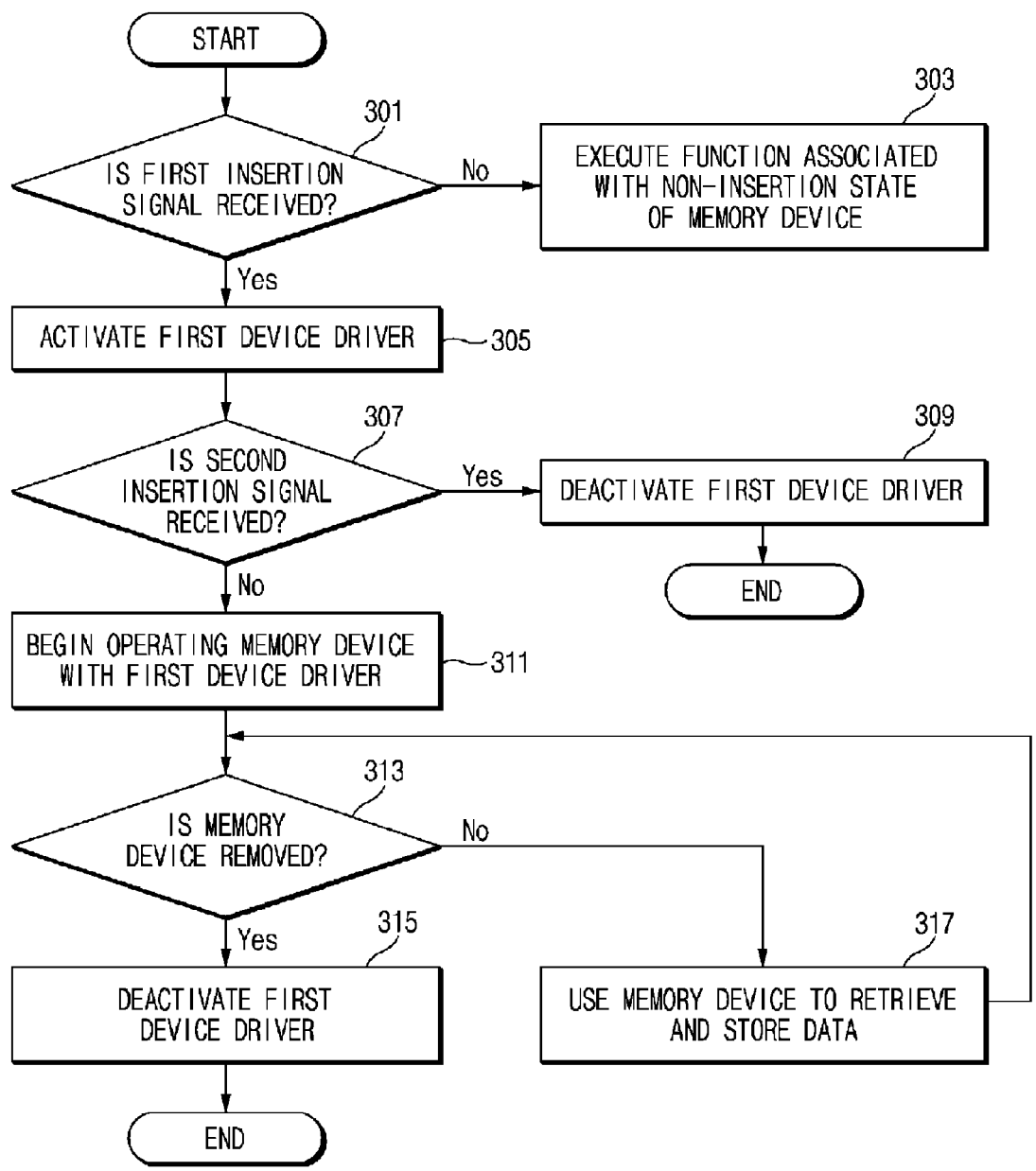
FIG. 3 is a flowchart of an example of a process, according to an embodiment of the present disclosure.

FIG. 3 is a flowchart of an example of a process, according to an embodiment of the present disclosure. In this example, the method of operating a memory device may be associated with an operation of the first device driver 131.

Referring to FIG. 3, with regard to an operation of a memory device, in operation 301, the host controller 120 may detect whether or not there is received a first insertion signal (e.g., an electric state signal of a switch transmitted through the detection signal line 22 when a memory device is inserted in the interface 170). If, in operation 301, the first insertion signal is not received, the host controller 120 may process a function associated with a non-insertion state of the memory device, in operation 303. For example, the host controller 120 may support at least one of data searching, communicating, or data outputting, based on information stored in an internal memory device of the electronic device 100. According to an embodiment, If, in operation 301, the first insertion signal is not received, the host controller 120 may execute operation 301 again. If, in operation 301, the first insertion signal is received, the host controller 120 may activate the first device driver 131, in operation 305. For example, the first device driver 131 may be loaded in the memory 130 under a control of the host controller 120. According to an embodiment, the host controller 120 may control to active the first device driver 131 loaded on the memory 130.

In operation 307, the host controller 120 may detect whether a second insertion signal (e.g., an electrical signal associated with a switch state transmitted through the detection signal line 23 or the detection terminal when a second-type memory device is inserted in the interface 170) is received. If the second insertion signal is received, the host controller 120 may deactivate the first device driver 131, in operation 309. For example, if the second-type memory device is detected, the host controller 120 may deactivate the first device driver 131. Additionally or alternatively, the host controller 120 may stop a process associated with the first device driver 131 and activate the second device driver 133 in response to the second insertion signal.

If, in operation 307, the second insertion signal is not received, the host controller 120 may control a process associated with the first-type memory device based on the first device driver 131, in operation 311. For example, the controller 120 may use the first device driver 131 to perform a task, such as initialization or data communication with the first-type memory device inserted in the interface 170.

In operation 313, the host controller 120 may detect whether there is an event associated with removing the memory device from the interface 170. For example, the host controller 120 may detect whether an electrical signal according to a change of a switch state due to extraction of the memory device from the interface 170 is transmitted through the detection signal line 22. Alternatively, the host controller 120 may detect whether the electrical signal transmitted through the detection signal line 23 or the detection terminal is changed.

If a signal varies as a memory device inserted is released, the host controller 120 may proceed to deactivate the activated device driver, in operation 315. For example, the host controller 120 may proceed to deactivate the first device driver 131. After the device driver is deactivated, the host controller 120 may proceed to operation 301 to support re-insertion processing of a memory device. In the case where the memory device is not extracted, for example, in the case where an insertion state of the memory device is maintained, the host controller 120 may use the memory device to retrieve and/or store data, in operation 317. For example, the host controller 120 may store data generated according to an operation of the electronic device 100 in the memory device or to output or transmit data stored in the memory device.

Figure 4:
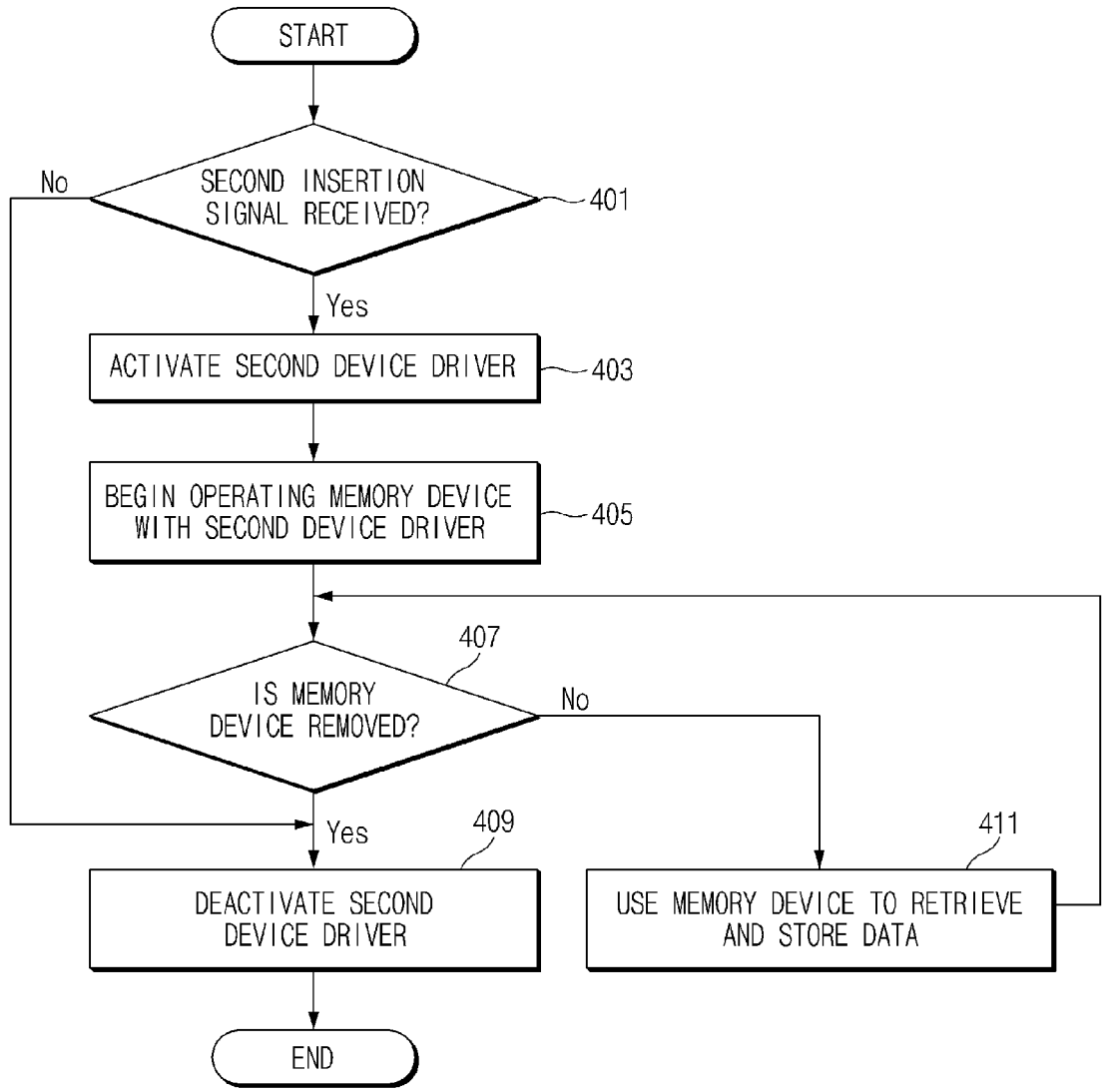
FIG. 4 is a flowchart of an example of a process, according to an embodiment of the present disclosure.

FIG. 4 is a flowchart of an example of a process, according to an embodiment of the present disclosure. In operation 401, the host controller 120 may detect whether a second insertion signal (e.g., an electrical signal, a ground signal, or the like associated with a change in a switch state transmitted from the detection signal line 23 or the detection terminal when a second type memory device is inserted). If the second insertion signal is not received, the host controller 120 may skip operations 403 to 407.

If the second insertion signal is received, the host controller 120 may activate the second device driver 133, in operation 403. In operation 405, the host controller 120 may begin operating the second-type memory device with the second device driver 133. For example, the host controller 120 may activate the second device driver 133 and transmit the second insertion signal to the second device driver 133. In response to the second insertion signal, the second device driver 133 may identify the memory device inserted in the interface 170 as the second-type memory device. The controller 120 may execute the second device driver 133 to initialize the second-type memory device. If the initialization for the second-type memory device is finished, the second device driver 133 may start reading and storing data into the second-type memory device.

In operation 407, the host controller 120 may detect whether an event associated with removing the memory device from the interface 170 is generated. If the memory device is extracted from the interface 170, the host controller 120 may proceed to deactivate the second device driver 133, in operation 409. As an example, if there is a change in the signal state of the detection signal line 23 or the detection terminal, the host controller 120 may determine that the memory device is in an extracted state. The host controller 120 may deactivate the second device driver 133 of the activated state or remove the second device driver 133 from the memory 130. According to an embodiment, after the inactivation of the second device driver 133, the host controller 120 may proceed to an operation ahead of operation 301 of FIG. 2 to check whether a memory device is newly or again inserted and support a process corresponding to the checking result. When the memory device inserted is not removed from the interface 170 (e.g., in the case where the memory device maintains an insertion state), the host controller 120 may use the memory device to read and store data, in operation 411. For example, the host controller 120 may read or write data from or in the second-type memory device inserted in the interface 170, in accordance with the insertion state of the second-type memory device.

Meanwhile, some operations (e.g., activation, inactivation, and so forth) of the first device driver 131 and the second device driver 133 are independently described in the above description, but various embodiments of the present disclosure are not limited thereto. For example, if a specific type of memory device is inserted into the interface 170, an electrical signal or a detection terminal signal may be generated in connection with states of a plurality of switches. In this case, the host controller 120 may transmit a signal, which may be transmitted from the detection signal line 22 and the detection signal line 23 (or the detection terminal), to the first device driver 131 and may transmit a signal, which may be transmitted from the detection signal line 23 (or the detection terminal), to the second device driver 133.

As described above, according to various embodiments, the method of operating an electronic device may include receiving a plurality of electrical signals, which may be changed or may be the same as a previous state corresponding to insertion of a memory device, determining a type of the memory device based on the plurality of electrical signals, and controlling an operation of the memory device based on the type of the memory device.

In various embodiments of the present disclosure, the receiving of the plurality of electrical signals may include receiving an electrical signal corresponding to insertion and extraction of the memory device, and receiving an electrical signal, whose state may be dependent on the type of the memory device.

In various embodiments of the present disclosure, the method may further include activating a first device driver, which is associated with operations of a first-type memory device, based on the electrical signal depending on the insertion and extraction of the memory device, and inactivating the first device driver activated or maintaining the activated state of the first device driver, based on the electrical signal, whose state is dependent on the type of the memory device.

In various embodiments of the present disclosure, the method may further include activating a second device driver, which is associated with operations of a second-type memory device, based on the electrical signal, whose state is dependent on the type of the memory device.

Figure 5:
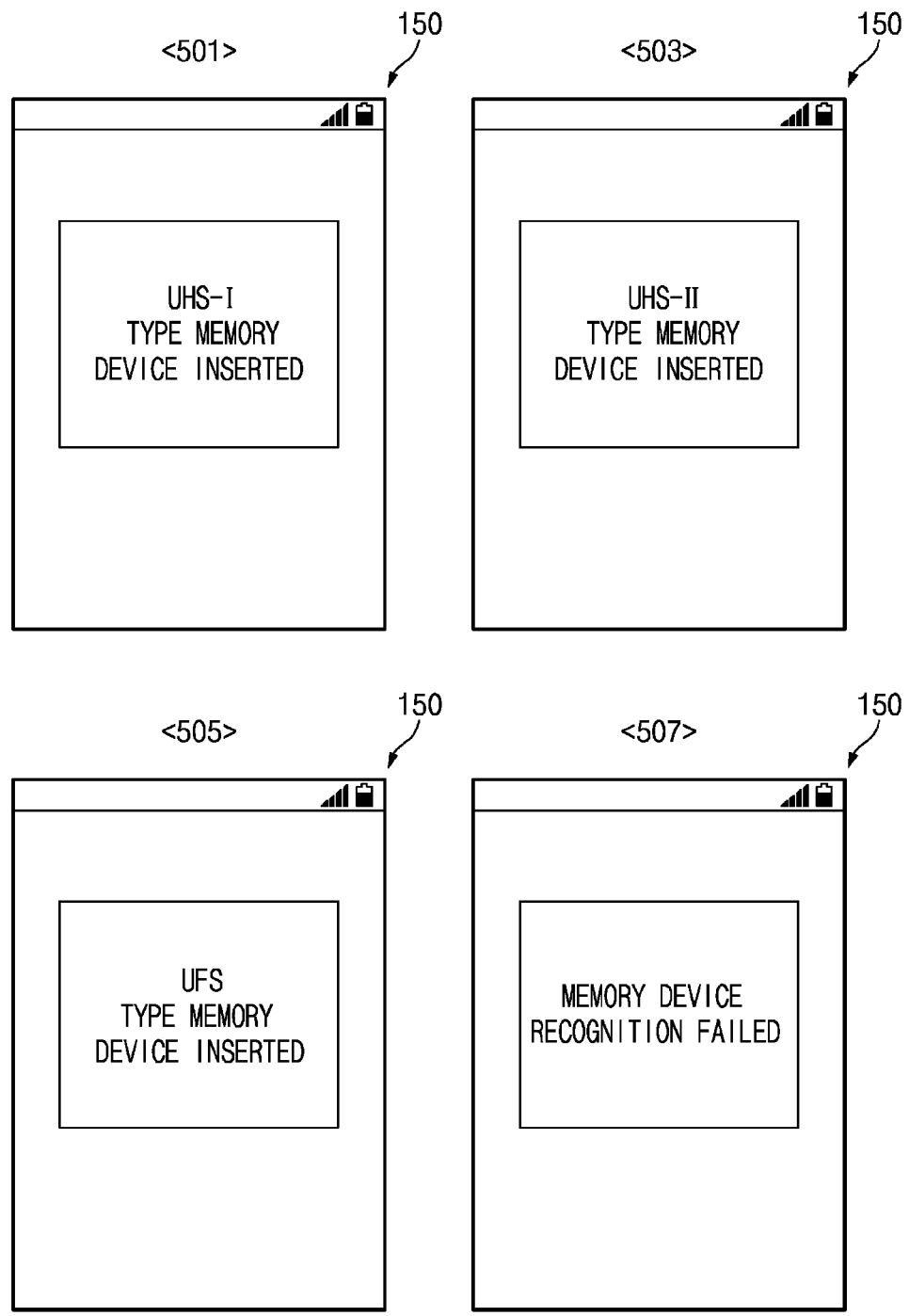
FIG. 5 is a diagram illustrating examples of a screen interface associated with an operation of a memory device, according to aspects of the disclosure.

FIG. 5 is a diagram illustrating examples of a screen interface associated with an operation of a memory device, according to aspects of the disclosure. Referring to FIG. 5, the electronic device 100 may output specific information determined on the basis of an insertion state of a memory device. According to an embodiment of the present disclosure, if an UHS-I type memory device is inserted into the interface 170, the electronic device 100 may output information associated with the insertion of the UHS-I type memory device on the display 150, as illustrated in a screen 501. Also, if an UHS-II type memory device is inserted into the interface 170, the electronic device 100 may output information associated with the insertion of the UHS-II type memory device on the display 150, as illustrated in a screen 503. In the afore-described operations, if a memory device is inserted into the interface 170, the host controller 120 of the electronic device 100 may determine which one of an SD card (e.g., of UHS-I type or UHS-II type) or an UFS card is inserted, based on a signal transmitted through the detection signal line. According to an embodiment of the present disclosure, if an electrical signal associated with a change in the switch state is transmitted through the detection signal line 22 and the detection signal line 23, the host controller 120 may determine that the SD card is inserted. The host controller 120 may operate the first device driver 131 in response to the insertion of the SD card. The first device driver 131 may determine which one of the SD cards of UHS-II type or UHS-I type is inserted, through communication with the inserted SD card, and perform initialization and data transmission/receipt of the SD card, based on the determined type. According to an embodiment of the present disclosure, the first device driver 131 may perform an initialization operation for the UHS-II type with respect to the inserted SD card, and if processing on the UHS-II type is impossible, the first device driver 131 may perform an initialization operation for the UHS-I type with respect to the inserted SD card.

In various embodiments of the present disclosure, if an UFS type memory device is inserted into the interface 170, the host controller 120 of the electronic device 100 may output information associated with the insertion of the UFS-type memory device on the display 150, as illustrated in a screen 505. In this regard, if an electrical signal associated with a change in the switch state is received through the detection signal line 22 and an electrical signal associated with no change in the switch state is received through the detection signal line 23 (or an electrical signal associated with a change in the switch state is received through the detection terminal), the host controller 120 may determine that the UFS-type memory device is inserted.

In various embodiments of the present disclosure, in the case where an error occurs in recognizing a device inserted in the interface 170, the host controller 120 of the electronic device 100 may display relevant information (e.g., failure in recognizing a memory device) on the display 150, as illustrated in a screen 507. For example, in the case where an error occurs in performing the initialization operation e.g., an initialization operation performed based on a type of the memory device determined by analyzing the signal received through the detection signal line 22 and the detection signal line 23 (or the detection terminal)), the host controller 120 may output an indication of the error.

Figure 6A:
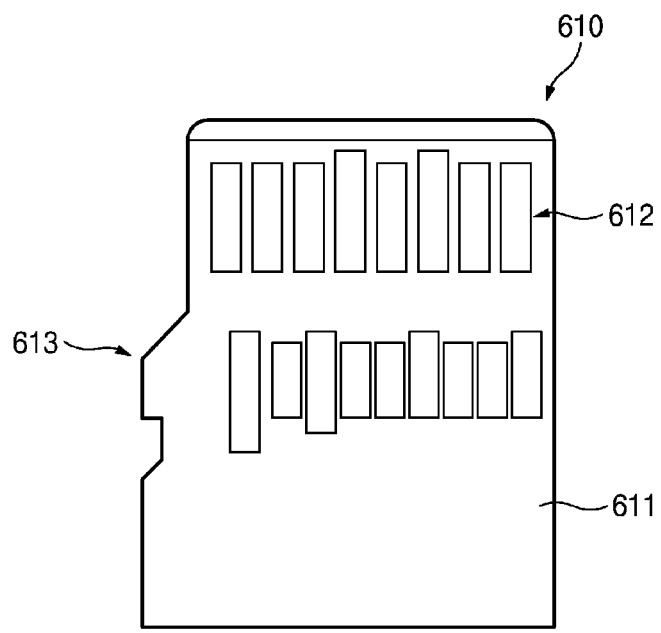
FIG. 6A is a diagram of an example of a memory device, according to an embodiment of the present disclosure.

FIG. 6A is a diagram of an example of a memory device, according to an embodiment of the present disclosure.

Referring to FIG. 6A, according to an embodiment of the present disclosure, a first-type memory device 610 may have an overall rectangular shape with a specific area and a specific width. For example, the first-type memory device 610 may be an SD card memory device of UHS-I or UHS-II type. The first-type memory device 610 may include a body 611, contact terminals 612, and a protrusion 613. The body 611 may have a specific thickness and a specific area. Further, the body 611 may include a case defining an internal space, in which a memory device is inserted. The body 611 may have a shape, allowing the first-type memory device 610 to be inserted in the interface 170. At least one contact terminal 612 may be disposed at a portion of the body 611. According to an embodiment of the present disclosure, the body 611 may include a portion, on which several contact terminals (e.g., some of 18 contact terminals 612) are provided.

The positions or the number of the contact terminals 612 may vary depending on whether the memory device is of UHS-I type or UHS-II type. For example, the UHS-I type memory device may include at least one of a first data contact terminal, a second data contact terminal, a third data contact terminal, a command terminal, a power terminal, a ground terminal, or a clock terminal The UHS-II type memory device may include a data-transmitting positive terminal, a data-transmitting negative terminal, a data-receiving positive terminal, a data-receiving negative terminal, a power terminal, at least one ground terminal, a reference clock positive terminal, a reference clock negative terminal, a software input/output terminal, and so forth. Further, the shape of the contact terminals 612 may vary depending on the type of the memory device. Also, positions of the contact terminals 612 may vary depending on the type of the memory device. According to an embodiment of the present disclosure, the UHS-I type memory device may include contact terminals that are different from those of the UHS-II type memory device. The contact terminals of the memory device may be disposed at positions corresponding to those of terminals of the body 611, which are determined depending on the type of the memory device.

At least one protrusion 613 may be disposed at a side of the body 611 of the first-type memory device 610. For example, if the first-type memory device 610 is inserted into the interface 170, the protrusion 613 may temporarily fasten or support the first-type memory device 610. The interface 170 may be arranged to allow the protrusion 613 to be inserted or extracted. According to an embodiment of the present disclosure, when the first-type memory device 610 is inserted into the interface 170, the protrusion 613 may be in physical or electrical contact with a switch unit connected to the second detection signal line 23.

Figure 6B:
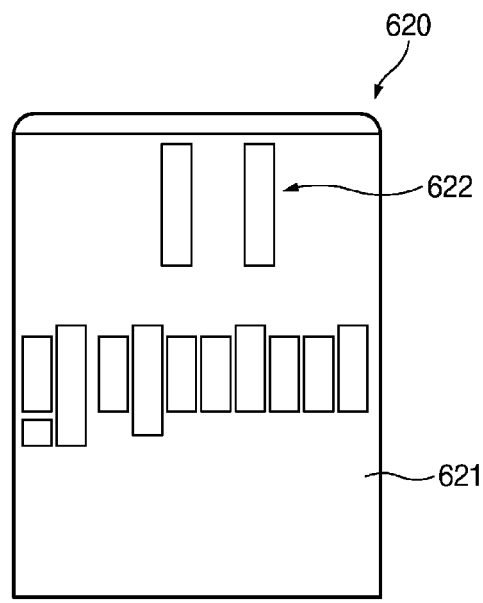
FIG. 6B is a diagram of an example of a memory device, according to an embodiment of the present disclosure.

FIG. 6B is a diagram of an example of a memory device, according to an embodiment of the present disclosure. Referring to FIG. 6B, according to an embodiment of the present disclosure, a second-type memory device 620 may have an overall rectangular shape with a specific area and a specific width. For example, the second-type memory device 620 may be an UFS-type memory device. The second-type memory device 620 may include a body 621 and contact terminals 622.

The body 621 may be disposed in a rectangular shape with a specific thickness. For example, the body 621 may have a shape, allowing the body 621 to be inserted in or extracted from the interface 170. At least one contact terminals may be provided on a portion (e.g., a rear surface) of the body 621. The body 621 may include a region, on which contact terminals are provided. Positions of the contact terminals in each of regions of the body 621 may be predetermined in accordance with properties of the contact terminals of the memory device. The type information of the memory device may be written on a top surface of the body 621. The overall shape or size of the body 621 may be formed to be similar to or smaller than a shape or size of a slot of the interface 170.

The number of the contact terminals 622 may vary depending on the type of the memory device. For example, if the second-type memory device 620 is of the UFS type, the UFS type memory device may include at least one of a first power terminal, a second power terminal, at least one ground terminal, a data-transmitting positive terminal, a data-transmitting negative terminal, a data-receiving positive terminal, a data-receiving negative terminal, or a reference clock terminal. The contact terminals 622 may be disposed at a position, which is predetermined on the portion of the body 621. According to an embodiment of the present disclosure, at least one specific terminal (e.g., the ground terminal) of the contact terminals 622 may be disposed at one (e.g., 18-th terminal) of specific positions for the contact terminals of the body 621. The specific terminal of the contact terminals 622 may be used as a detection contact terminal. For example, when the second-type memory device 620 is inserted in the interface 170, the detection contact terminal may come in contact with a detection terminal disposed in the interface 170. Although an example, in which the first-type memory device and the second-type memory device have a rectangular body, has been described above, various embodiments of the present disclosure are not limited thereto. For example, the memory device may have a modified rectangular shape, at least a portion of which is rounded or removed. Alternatively, the memory device may have a circular or polygonal shape.

Figure 7A:
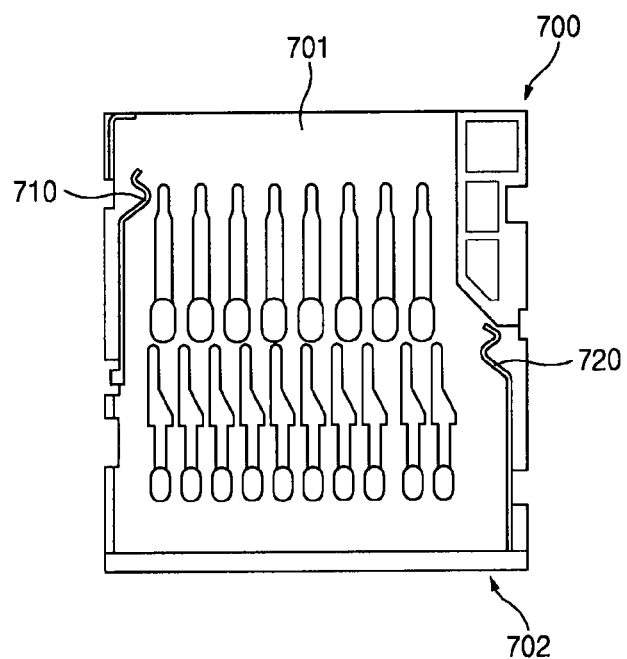
FIG. 7A is a diagram illustrating an example of a memory interface, according to an embodiment of the present disclosure.

FIG. 7A is a diagram illustrating an example of a memory interface, according to an embodiment of the present disclosure.

Referring to FIG. 7A, according to an embodiment of the present disclosure, a memory interface 700 may include a receptacle 701, a switch unit 710, a switch unit 720, and a slot 702.

As an example, the receptacle 701 may include rectangular-shaped top and bottom cases, which are overlapped with and spaced apart from each other by a specific interval to define a slot, allowing a memory device to be inserted therein. The receptacle 701 may be formed of, for example, a metallic or plastic material. At least one signal terminals (e.g., of a metallic or conductive material) may be provided on at least a portion (e.g., a bottom surface) of the receptacle 701. The signal terminals may be in electric contact with at least one contact terminals disposed in the memory device, when the memory device is inserted in the memory interface 700. The number of the signal terminals may be predetermined (e.g., to 17 or 18). At least a portion of the signal terminals may be in electric contact with the contact terminals of the inserted memory device. According to an embodiment of the present disclosure, at least one of the signal terminals may be used to realize such an electric contact, depending on the type of the inserted memory device. Also, at least one of the remaining ones of the signal terminals may not be used for such an electric contact, depending on the type of the inserted memory device. For example, in instances in which the first-type memory device 610 is inserted in the memory interface 700, may not come in contact with any of the terminals on the first-type memory device 610, whereas when the second-type memory device 620 is inserted in the memory interface 700, the same terminal may come in contact with one of the terminals on the memory device 620.

The switch unit 710 may be disposed at a portion of the receptacle 701. As an example, the switch unit 710 may include a leaf spring, whose physical shape is changed when the memory device is inserted in the receptacle 701. For example, the switch unit 710 may be disposed at a sidewall of the receptacle 701 and may include at least a portion protruding toward a center region of the receptacle 701 by a specific length. As a result of this shape, when a memory device is inserted, the switch unit 710 may be pushed in such a way that its protruding portion is moved toward the sidewall of the receptacle 701 by a body of the memory device. This movement of the switch unit 710 may lead to a change in electric state of the switch unit 710. For example, a pull-up power with a specific level may be applied to an end portion of the switch unit 710. A ground terminal may be disposed on other end portion of the switch unit 710. In the case where, as a result of a change in physical shape of the switch unit 710, the end portion is in contact with the other end portion, a voltage of the pull-up power applied to the end portion may be decreased. An electrical signal corresponding to this voltage reduction may be transmitted to the host controller 120. In this regard, the detection signal line 22 may be connected to and between the switch unit 710 and the host controller 120. According to an embodiment of the present disclosure, if the first-type memory device 610 or the second-type memory device 620 is inserted, a physical shape of the switch unit 710 may be deformed, and an electrical signal corresponding to the physical deformation may be transmitted to the host controller 120.

The switch unit 720 may be disposed at a region of the receptacle 701, which is different or spaced apart from that for the switch unit 710. For example, the switch unit 720 may be provided adjacent to the slot 702 serving as an entrance of the receptacle 701. As another example, the switch unit 720 may be disposed at a position, where the switch unit 720 can be mechanically deformed by the protrusion of the first-type memory device 610 when the memory device 610 is inserted in the receptacle 701. As other example, the switch unit 720 may be disposed at a portion of the receptacle 701, where the switch unit 720 is not mechanically deformed by the second-type memory device 620 inserted therein. The switch unit 720 may be connected with the detection signal line 23. In the case where the pull-up power is formed and the other end portion is in contact with the end portion, the end portion of the switch unit 720 may have an electrically-changed state. The changed electrical signal may be transmitted to the host controller 120 and may be used to determine the type of the inserted memory device.

The slot 702 may serve as the entrance to the receptacle 701 and may be an opening, allowing the memory device to be inserted in the receptacle 701. The memory device may be inserted or extracted through the slot 702. The slot 702 may be provided to have a shape similar to than that of a sidewall of the memory device or a size larger than that of the sidewall of the memory device.

In various embodiments of the present disclosure, the detection terminal of the signal terminals may be omitted, depending on the presence or absence of the switch unit 720. For the interface 700 provided with the switch unit 720, the signal terminals may consist of, for example, 17 terminals, except for the detection terminal. By contrast, for the memory interface 700 without the switch unit 720, the signal terminals may consist of, for example, 18 terminals including the detection terminal. In the case where the switch unit 720 is provided, the detection signal line 23 may be connected to the other end portion of the switch unit 720. In the case where the detection terminal is provided, the detection signal line 23 may be connected to the detection terminal. In various embodiments of the present disclosure, the host controller 120 may recognize the types of respective memory devices using a difference between the cases with the switch unit 720 and with the detection terminal. For example, in the case that the switch unit 720 is provided, the host controller 120 may determine that the first-type memory device 610 is inserted, if a change in an electrical signal is received from both of the switch unit 710 and the switch unit 720. By contrast, if the host controller 120 receives only a change in an electrical signal of the switch unit 710, the host controller 120 may determine that the second-type memory device 620 is inserted. In the case where the detection terminal is provided, the host controller 120 may determine that, if a change in an electrical signal is received from through the switch unit 710 and the detection terminal, the second-type memory device 620 is inserted, and may determine that, if a change in an electrical signal is received from the switch unit 710, the first-type memory device 610 is inserted.

Figure 7B:
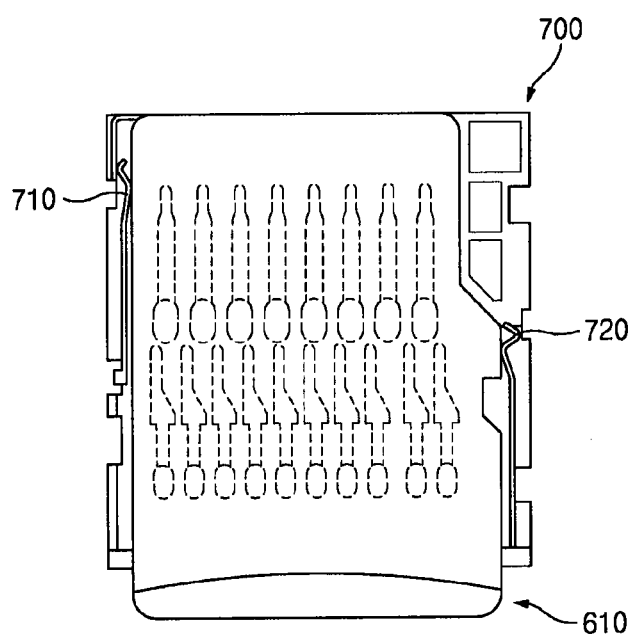
FIG. 7B is a diagram illustrating an example of a memory interface with a memory device inserted therein, according to an embodiment of the present disclosure.

FIG. 7B is a diagram illustrating an example of a memory interface with a memory device inserted therein, according to an embodiment of the present disclosure.

Referring to FIG. 7B, according to an embodiment of the present disclosure, the first-type memory device 610 may be inserted into the memory interface 700 through the device insertion part. Although the memory interface 700 is shown to be shorter than a total length of the first-type memory device 610, various embodiments of the present disclosure are not limited thereto. For example, the case of the electronic device 100 provided to over the memory interface 700 may be larger than the device insertion part of the memory interface 700, and a structure including the memory interface 700 and the case of the electronic device 100 may be disposed in such a way that its size is similar to or larger than that of the first-type memory device 610.

If the first-type memory device 610 is inserted into the memory interface 700, a portion of the first-type memory device 610 (e.g., a corner portion of the memory device) may be in physical or electrical contact with the switch unit 710. In this case, an end portion of the switch unit 710 may be pushed out by the first-type memory device 610, thereby coming in electric contact with other end portion of the switch unit 710. In various embodiments of the present disclosure, a specific portion (e.g., a protruding portion) of the first-type memory device 610 may be in physical or electrical contact with an end portion of the switch unit 720, when the memory device 610 is inserted in the memory interface 700. During this process, the specific portion of the first-type memory device 610 may push the end portion of the switch unit 720, and thus, an end portion of the switch unit 720 may come in electrical contact with other end portion thereof.

The host controller 120 may receive changes in pull-up voltages at the other end portions of the switch unit 710 and the switch unit 720, respectively, through the detection signal line 22 and the detection signal line 23 and may determine that the first-type memory device 610 is inserted.

Figure 7C:
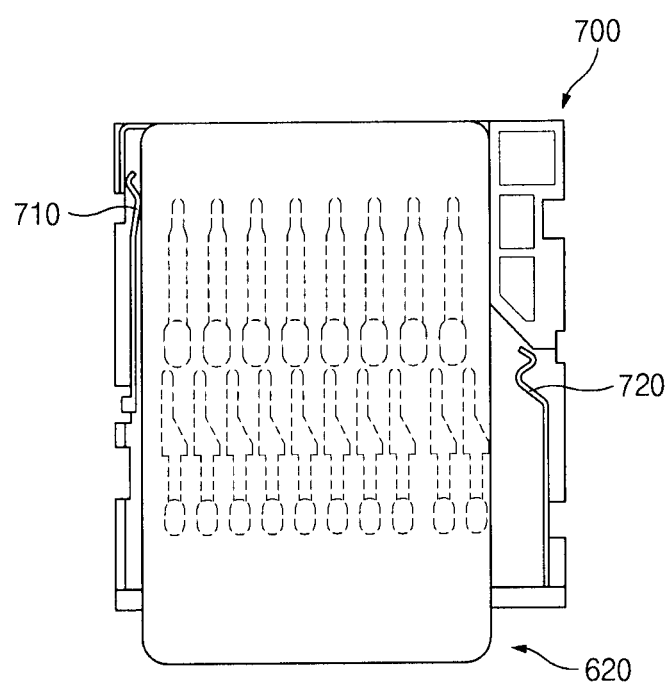
FIG. 7C is a diagram illustrating an example of a memory interface with a memory device inserted therein, according to an embodiment of the present disclosure.

FIG. 7C is a diagram illustrating an example of a memory interface with a memory device inserted therein, according to an embodiment of the present disclosure. Referring to FIG. 7C, according to an embodiment of the present disclosure, the second-type memory device 620 may be inserted into the memory interface 700 through the device insertion part. The memory interface 700 may include a slot, allowing at least a portion of the second-type memory device 620 to be inserted therein. If the second-type memory device 620 is inserted into the memory interface 700, a portion of the second-type memory device 620 (e.g., a corner or side portion of the memory device) may be in physical or electrical contact with the switch unit 710. Two end portions of the switch unit 710, which are spaced apart from each other by a specific interval, may be mechanically deformed by the insertion of the second-type memory device 620, thereby coming in electric contact with each other. For example, the additional protruding portion may not be disposed in the second-type memory device 620. For example, the switch unit 720 of the second-type memory device 620 may be disposed to be parallel to a sidewall adjacent to the switch unit 720. Accordingly, the second-type memory device 620 may not be in physical or electrical contact with the switch unit 720 or may have a shape, not allowing the switch unit 720 to be physically deformed. As a result, the switch unit 720 may maintain its previous state, even when the second-type memory device 620 is inserted.

The host controller 120 may receive a change in a pull-up voltage at the other end portion of the switch unit 710 through the detection signal line 22 and may receive no change in a pull-up voltage at the other end portion of the switch unit 720 through the detection signal line 23. Based on the received signals, the host controller 120 may determine that the second-type memory device 620 is inserted.

Figure 8A:
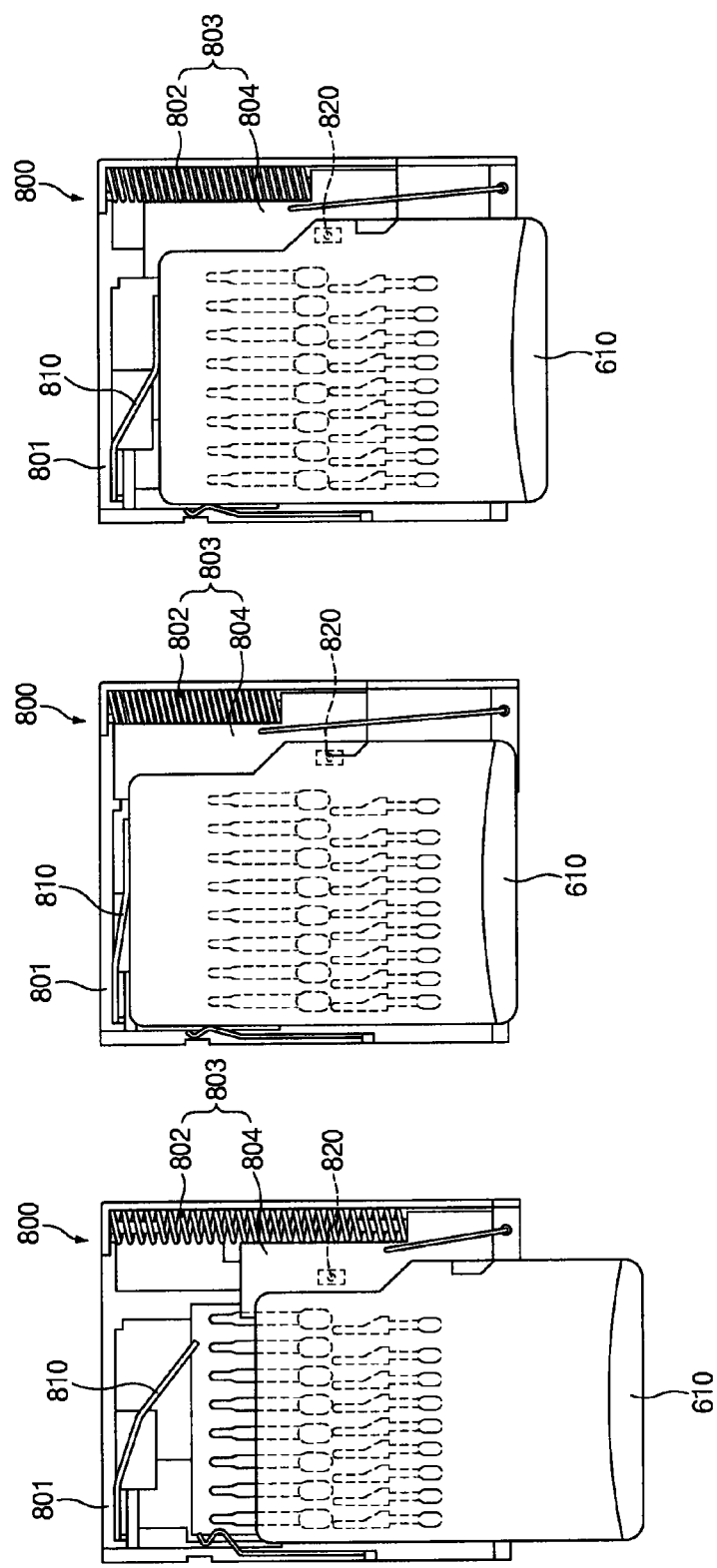
FIG. 8A is a diagram illustrating an example of a memory interface with a memory device inserted therein, according to an embodiment of the present disclosure.

FIG. 8A is a diagram illustrating an example of a memory interface with a memory device inserted therein, according to an embodiment of the present disclosure. Referring to FIG. 8A, according to an embodiment of the present disclosure, a memory interface 800 may be of a push-push type. With regard to this, the memory interface 800 may include a receptacle 801, a switch unit 810, a switch unit 820, and a memory insertion/extraction supporting device 803.

The receptacle 801 may have a rectangular slot defined by top and bottom plates, which are vertically spaced apart from each other by a specific interval. At least one signal terminals may be provided on at least one of the top plate or the bottom plate of the receptacle 801. At least a portion of the signal terminals may come in electric contact with the contact terminals of the first-type memory device 610 inserted in the memory interface 800.

The switch unit 810 may be disposed in the receptacle 801 (e.g., in an internal region of the slot) and may include an end portion protruding toward an entrance of the slot. In the case where the first-type memory device 610 is inserted, the switch unit 810 may be in contact with and be mechanically deformed by the body of the first-type memory device 610. The switch unit 810 may be configured in such a way that the end portion thereof is electrically connected to other end portion thereof, when the switch unit 810 is physically deformed more than a specific limit. The switch unit 810 may be connected to, for example, the detection signal line 22, and thus, an electrical signal corresponding to the insertion of the first-type memory device 610 may be transmitted to the host controller 120.

The switch unit 820 may be disposed at a portion of the receptacle 801, where the switch unit 820 can have its previous electric state, regardless of the insertion of the first-type memory device 610. For example, the switch unit 820 may be disposed below the insertion/extraction supporting device 803. According to an embodiment of the present disclosure, the switch unit 820 may be disposed in the form of a dome. The switch unit 820 may be a dome-type switch unit and it may be disposed below the insertion/extraction supporting device 803, and thus, the switch unit 820 may be electrically connected with the first memory type device. In the case where the first-type memory device 610 is inserted, it is possible for the switch unit 820 to maintain an electric contact with a protruding portion of the first-type memory device 610. In the case where the switch unit 810 has an electrically changed state and the switch unit 820 has the same state as its previous electric state, the host controller 120 may determine that the first-type memory device 610 is inserted.

The insertion/extraction supporting device 803 may include a device latch 804 and a spring device 802. The device latch 804 may be configured in such a way that it can be moved along forward and backward directions parallel to a longitudinal direction of the receptacle 801. A portion of the device latch 804 may be connected to the spring device 802. Accordingly, in the case where the device latch 804 is moved in the backward direction (e.g., toward an inner space of the receptacle 801), an elastic force of the spring device 802 may be increased, and consequently, the device latch 804 may have an increased restoring force. If the device latch 804 is moved backwards to a position beyond a specific depth, a temporary lock is formed on the device latch 804 structurally. The temporary lock may fix the first-type memory device 610. The switch unit 820 may be disposed below the device latch 804. The device latch 804 may expose the switch unit 820, during its forward and backward movement. In the case where the first-type memory device 610 is inserted, the device latch 804 may be pushed out toward the backward direction and the protruding portion of the first-type memory device 610 may be disposed to cover the switch unit 820.

In various embodiments of the present disclosure, for the interface 800 of the push-push type, the switch unit 820 may be omitted and at least one of the signal terminals may serve as the detection terminal. For example, an 18-th signal terminal of the interface 800 may be used as the detection terminal. In instances in which the detection terminal is disposed at a region for the signal terminals, the switch unit 820 may be removed and the detection signal line 23 may be electrically connected to the detection terminal. According to an embodiment of the present disclosure, the host controller 120 may determine a type of the inserted memory device, based on values of the electrical signals to be transmitted through the detection signal line 22 or the detection signal line 23.

Figure 8B:
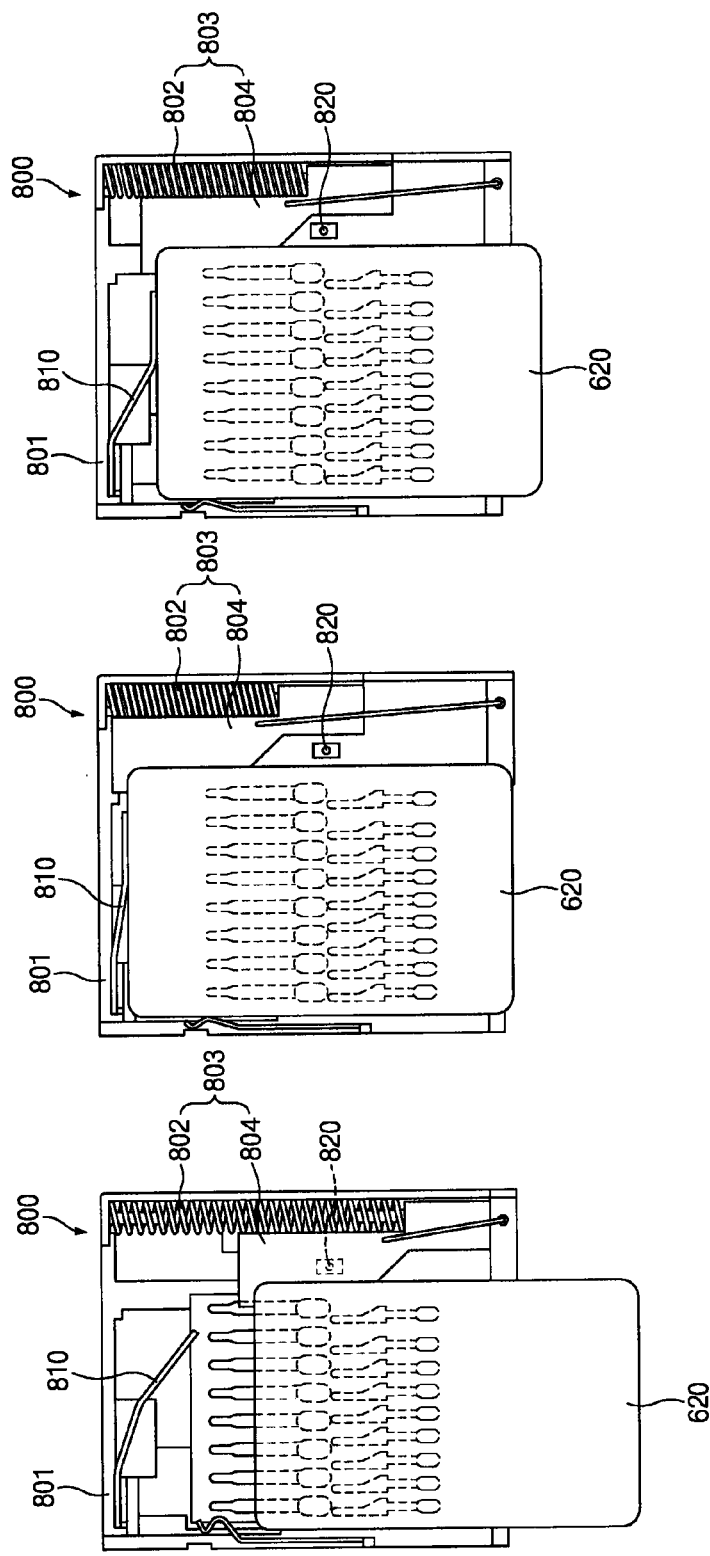
FIG. 8B is a diagram illustrating an example of a memory interface with a memory device inserted therein, according to an embodiment of the present disclosure.

FIG. 8B is a diagram illustrating an example of a memory interface with a memory device inserted therein, according to an embodiment of the present disclosure. Referring to FIG. 8B, according to an embodiment of the present disclosure, the second-type memory device 620 may be inserted in the interface 800 of a push-push type. The interface 800 may include the receptacle 801, the switch unit 810, the switch unit 820, and the insertion/extraction supporting device 803, as described with reference to FIG. 8A. In various embodiments of the present disclosure, additionally or alternatively, at least one of signal terminals disposed in the receptacle 801 may serve as a detection terminal. In addition, a signal terminal serving as a detection terminal may be provided.

As illustrated in FIG. 8B, any protrusion portion may not be disposed at a side of the second-type memory device 620, and thus, the second-type memory device 620 may be in physical or electrical contact with the switch unit 810 during inserting the second-type memory device 620 into the interface 800. Furthermore, a portion of the second-type memory device 620 may be in contact with the device latch 804 of the insertion/extraction supporting device 803.

In the case where the second-type memory device 620 is moved toward a rear portion of the receptacle 801 (e.g., into the slot), the device latch 804 may also be moved toward the rear portion of the receptacle 801. As a result, the switch unit 820 covered with the device latch 804 may be exposed to the outside. According to an embodiment of the present disclosure, when the switch unit 820 is covered with the device latch 804, the device latch 804 may make it possible for two end portions of the switch unit 820 to come in contact with each other, but the movement of the device latch 804 may lead to a physical and electrical separation between the two end portions of the switch unit 820 and consequently a change in electric state of the switch unit 820. The change in the electric state of the switch unit 820 may be transmitted to the host controller 120 through the detection signal line 23 connected to the switch unit 820.

In the case where the second-type memory device 620 is extracted from the memory interface 800, the device latch 804 may return to its initial position. In this process, the device latch 804 may be located to re-cover the switch unit 820. This may lead to a change in the electric state of the switch unit 820 (e.g., from the off state to the on state). Based on the change in the electric state of the switch unit 820, the host controller 120 may determine that the second-type memory device 620 is extracted from the interface 800.

In the meantime, the above description refers to examples, in which a memory device is inserted in a portable electronic device, but various embodiments of the present disclosure are not limited thereto. Various embodiments of the present disclosure may be applied to a variety of electronic devices (such as, laptop computers, slate PCs, game consoles, note PCs, note pads, or the like), in which a memory device can be inserted. With regard to an operation for recognizing a type of the memory device, electronic devices according to various embodiments may include at least one of a switch unit, whose electric state is changed by insertion or extraction of a body (e.g., a case) of a memory device, or a detection terminal in electric contact with a contact terminal of the memory device, as described above.

Figure 9:
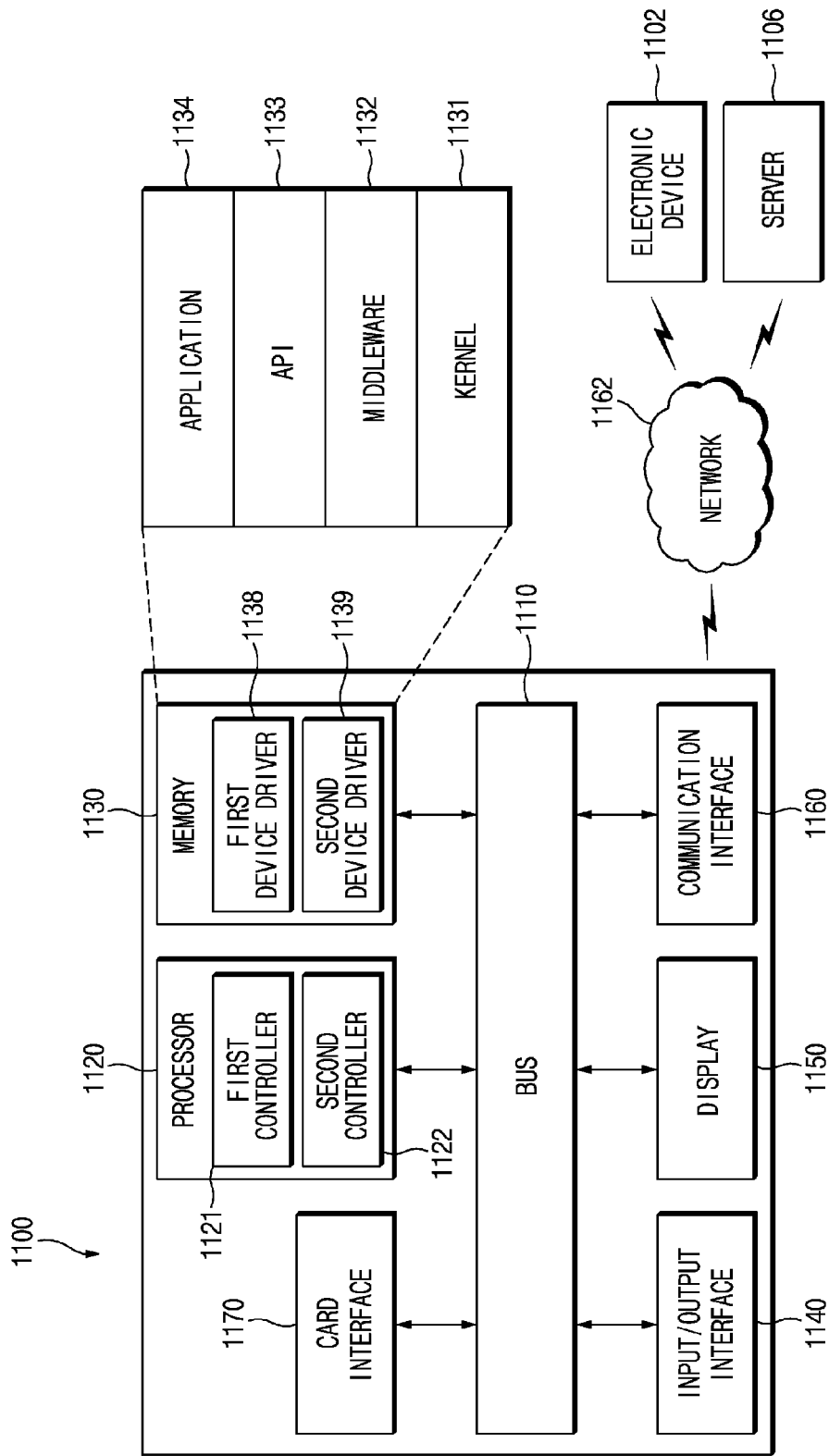
FIG. 9 is a block diagram of an example of an electronic device, according to an embodiment of the present disclosure.

FIG. 9 is a block diagram illustrating an electronic device, in which a memory device according to an embodiment of the present disclosure can be inserted and extracted, and an operation environment of the electronic device.

Referring to FIG. 9, according to an embodiment of the present disclosure, an electronic device 1100, an external electronic device 1102, a server 1106, a network 1162 may be included in operation environment of an electronic device, allowing for insertion and extraction of a memory device.

Under the above-described environment for operating an electronic device, the network 1162 may form a communication channel between the electronic device 1100 and the external electronic device 1102. The network 1162, for example, may include network device components associated with the formation of a mobile communication channel. Alternatively, the network 1162 may include network device components associated with the formation of an internet communication channel. The network 1162 may support a data transmission/receipt between the electronic device 1100 and the external electronic device 1102. Moreover, the network 1162 may support data transmission/receipt between the electronic device 1100 and the server 1106.

The server 1106 may form a communication channel with the electronic device 1100 or the external electronic device 1102 through the network 1162. According to an embodiment of the present disclosure, the server 1106 may provide data associated with an operation of a specific application of the electronic device 1100. For example, the server 1106 may provide a specific data (e.g., video data, game data, text data, and the like) to the electronic device 1100, the external electronic device 1102, and so forth. Data provided to the electronic device 1100 from the server 1106 may be stored in at least one of a memory 1130 or the memory device 180 inserted in an interface 1170.

The external electronic device 1102 may form a communication channel with a communication interface 1160 of the electronic device 1100. For example, the external electronic device 1102 may form a near-field communication channel or a wired communication channel with the communication interface 1160. According to an embodiment of the present disclosure, the external electronic device 1102 may form a Bluetooth communication channel, a Wi-Fi direct communication channel, and so forth with the communication interface 1160. Alternatively, the external electronic device 1102 may form a communication channel with the electronic device 1100 through the network 1162. For example, the external electronic device 1102 may include a cellular communication module and may form a mobile communication channel with the electronic device 1100. Alternatively, the external electronic device 1102 may include a Wi-Fi communication module and may form a Wi-Fi communication channel with the electronic device 1100. The external electronic device 1102 may transmit scrollable information to the electronic device 1100.

The electronic device 1100 may form a communication channel with at least one of the external electronic device 1102 or the server 1106. A screen associated with other devices connected through the communication channel may be displayed on a display of the electronic device 1100. The electronic device 1100 may store data, transmitted to or received from the server 1106 or the external electronic device 1102, in the memory 1130 or a memory device inserted in the interface 1170.

Referring to FIG. 9, the electronic device 1100 may include a bus 1110, a processor 1120, a memory 1130, an input/output interface 1140, a display 1150, a communication interface 1160, and the interface 1170.

The bus 1110 may interconnect the above-described components and may be a circuit for conveying communications (e.g., a control message, an input event, data, and so forth) among the above-described components. For example, the bus 1110 may transfer an input signal, input through the input/output interface 1140, to the processor 1120. Moreover, the bus 1110 may transfer a control signal from the processor 1120 to at least one of the memory 1130 or a memory device connected to the interface 1170. For example, the bus 1110 may transfer data stored in the memory device connected to the interface 1170 to a specific region of the memory 1130. Moreover, the bus 1110 may transfer data stored in the memory 1130 to the memory device connected to the interface 1170.

The processor 1120 may receive instructions from the above-described other components (e.g., the input/output interface 1140, the display 1150, the communication interface 1160, or the like) through the bus 1110, may decode the received instructions, and may perform data processing or operations according to the decoded instructions. The processor 1120 may be configured to control the memory 1130 and the memory device connected to the interface 1170 through the bus 1110 or in a direct manner.

In various embodiments of the present disclosure, the processor 1120 may include a first controller 1121 and a second controller 1122. Similar to the first controller 121 described with reference to FIG. 1, the first controller 1121 may support operations associated with a first device driver 1138 or a first-type memory device. Similar to the second controller 123 described with reference to FIG. 1, the second controller 1122 may support operations associated with a second device driver 1139 or a second-type memory device. In various embodiments of the present disclosure, the processor 1120 may detect a type of a memory device connected to the interface 1170 and may control activation of one of the first controller 1121 and the second controller 1122, based on the type.

The memory 1130 may store instructions or data received from the processor 1120 or other components (e.g., the input/output interface 1140, the display 1150, the communication interface 1160, the interface 1170, or the like) or generated by the processor 1120 or the other components. The memory 1130 may include, for example, programming modules such as a kernel 1131, a middleware 1132, an application programming interface (API) 1133, and an application 1134. Each of the above-described programming modules may be implemented in the form of software, firmware, hardware, or a combination of at least two thereof.

The kernel 1131 may control or manage system resources (e.g., the bus 1110, the processor 1120, the memory 1130, a memory device connected to the interface 1170, or the like) that are used to perform operations or functions of remaining other programming modules, for example, the middleware 1132, the API 1133, or the application 1134. Moreover, the kernel 1131 may provide an interface that accesses each of the components of the electronic device 1100 on the middleware 1132, the API 1133, or the application 1134 to control or manage them.

The middleware 1132 may perform a mediation role so that the API 1133 or the application 1134 communicates with the kernel 1131 to exchange data. Moreover, with regard to task requests received from the application 1134, for example, the middleware 1132 may perform a control (e.g., scheduling or load balancing) on a task request using a method of assigning the priority, which makes it possible to use a system resource (e.g., the bus 1110, the processor 1120, the memory 1130, a memory device connected to the interface 1170, or the like) of the electronic device 1100, to the at least one application 1134.

The API 1133 may be an interface through which the application 1134 controls a function provided by the kernel 1131 or the middleware 1132, and may include, for example, at least one interface or function (e.g., an instruction) for a file control, a window control, image processing, a character control, or the like.

According to various embodiments, the application 1134 may include a short messaging service/multimedia messaging service (SMS/MMS) application, an e-mail application, a calendar application, an alarm application, a health care application (e.g., an application for measuring an exercise amount or a blood sugar), an environment information application (e.g., an application for providing air pressure, humidity, or temperature information), or the like. Additionally or alternatively, the application 1134 may be an application associated with information exchange between the electronic device 1100 and an external electronic device (e.g., the external electronic device 1102). The application associated with information exchange may include, for example, a notification relay application for transferring specific information to an external electronic device or a device management application for managing an external electronic device.

For example, the notification relay application may include a function for providing notification information, which may be generated from another application (e.g., an SMS/MMS application, an e-mail application, a health care application, an environment information application, or the like) of the electronic device 1100, to an external electronic device (e.g., the external electronic device 1102). Additionally or alternatively, the notification relay application, for example, may receive notification information from an external electronic device (e.g., the external electronic device 1102) and may provide it to a user. The device management application, for example, may manage (e.g., install, delete, or update) a function (e.g., for turning an external electronic device itself or its component on or off or for controlling brightness or resolution of a display screen) associated with at least a portion of the external electronic device (e.g., the external electronic device 1102) communicating with the electronic device 1100, an application running on the external electronic device, or a service (e.g., a calling service or a messaging service) provided by the external electronic device. According to various embodiments, in the case where the external electronic device is an MP3 player, the application 1134 may include an application associated with music reproduction. Similarly, in the case that the external electronic device is a mobile medical device, the application 1134 may include an application associated with a health care. According to an embodiment of the present disclosure, data associated with the application 1134 may be processed based on the memory 1130 of the memory device connected to the interface 1170.

In various embodiments of the present disclosure, the memory 1130 may include a first device driver 1138 or a second device driver 1139. The first device driver 1138 may be activated, if a memory device is inserted into the interface 1170, and may be maintained in the activated state or may be deactivated, depending on the type of the memory device. For example, if the inserted memory device is a first-type memory device (e.g., an SD memory card), the first device driver 1138 may be maintained in the activated state to support operations associated with the first-type memory device. If the inserted memory device is a second-type memory device (e.g., a UFS memory card), the first device driver 1138 may be changed from the activated state to the deactivated state. In various embodiments of the present disclosure, under the control of the processor 1120, the first device driver 1138 may be designed to determine the type of the memory device inserted in the interface 1170 and then, to have an activated state or be maintained in an inactivation state. If a second-type memory device is inserted into the interface 1170, the second device driver 1139 may be activated. The second device driver 1139 may support operations (e.g., data reading, data writing, and so forth) of the second-type memory device, when it is in an activated state. With regard to the operation of the inserted memory device, the first device driver 1138 or the second device driver 1139 may manage one of the first controller 1121 and the second controller 1122.

The input/output interface 1140 may transfer an instruction or data, input from a user through an input/output device (e.g., a sensor, a keyboard, or a touch screen), to the processor 1120, the memory 1130, the communication interface 1160, or the interface 1170, for example, through the bus 1110. Moreover, the input/output interface 1140 may output an instruction or data, received from the processor 1120, the memory 1130, the communication interface 1160, or a memory device inserted in the interface 1170 through the bus 1110, via the input/output device (e.g., a speaker or a display 1150). In various embodiments of the present disclosure, the input/output interface 1140 may include a physical key button (e.g., a home key, a side key, a power key, or the like), a jog key, a keypad, or the like. The input/output interface 1140 may include a virtual keypad, which is displayed on the display 1150 to serve as an input device. The input/output interface 1140 may be used to produce an input signal associated with execution of at least one application or an input signal requesting to supply an electric power to the electronic device 1100 in a power-off state.

In various embodiments of the present disclosure, the input/output interface 1140 may perform a function associated with an audio signal processing. In this regard, the input/output interface 1140 may include at least one of a speaker or a microphone, which is disposed in singular or in plural. The input/output interface 1140 may output at least one of, for example, an audio signal associated with the presence or absence of a memory device inserted in the interface 1170, an audio signal associated with a type of an inserted memory device, an audio signal associated with an extraction state of the inserted memory device, or an audio signal associated with an error in recognizing the memory device. In certain cases, outputting an additional audio signal through the input/output interface 1140 may be limited, in accordance with the setting of the electronic device.

The display 1150 may display a variety of information (e.g., multimedia data, text data, or the like). For example, the display 1150 may output at least one of a lock screen, an idle screen, or the like. The display 1150 may output a screen for executing a specific function (e.g., for playing sound or video, for displaying a broadcasting screen received, or the like), in response to execution of the function. According to an embodiment of the present disclosure, the display 1150 may output information (e.g., at least one of an image or a text) indicating whether a memory device is inserted in the interface 1170. Moreover, the display 1150 may display a text or an image, which is associated with data stored in a memory device inserted in the interface 1170. The display 1150 may display relevant information, in response to extraction of an inserted memory device. In various embodiments of the present disclosure, the display 1150 may output information associated with a type of a memory device.

The communication interface 1160 may establish communication between the electronic device 1100 and an external electronic device (e.g., at least one of the electronic device 1102 or the server 1106). For example, the communication interface 1160 may be connected to the network 1162 through wireless communication or wired communication to communicate with the external electronic device. The wireless communication may include at least one of, for example, wireless-fidelity (Wi-Fi), Bluetooth (BT), Bluetooth low energy (BLE), near-field communication (NFC), global positioning system (GPS), or cellular communication (e.g., LTE, LTE-A, CDMA, WCDMA, UMTs, WiBro, GSM, or the like). The wired communication may include at least one of, for example, a universal serial bus (USB), a high definition multimedia interface (HDMI), a recommended standard-232 (RS-232), or a plain old telephone service (POTS).

According to an embodiment of the present disclosure, the network 1162 may be a telecommunications network. The telecommunications network may include at least one of a computer network, an internet, an internet of things, a telephone network, or the like. According to an embodiment of the present disclosure, a protocol (e.g., a transport layer protocol, a data link layer protocol, or a physical layer protocol) for communication between the electronic device 1100 and an external device may be supported by at least one of the kernel 1131, the middleware 1132, the application programming interface 1133, the application 1134, or the communication interface 1160.

In the case where the electronic device 1100 supports a plurality of communication methods, the communication interface 1160 may include a plurality of communication modules. For example, the electronic device 1100 may include a communication module (e.g., a near-field communication module or a direct communication module), allowing for formation of a direct communication channel with the external electronic device 1102. Here, the near-field communication module or the direct communication module may include at least one of various communication modules including a Wi-Fi direct communication module, a Bluetooth communication module, a zigbee communication module, or the like. Also, the direct communication module may include a wired communication module (e.g., a cable or the like).

According to an embodiment of the present disclosure, the communication interface 1160 may receive a specific type of data (e.g., an image file, a document file, a webpage, or the like) from at least one of the external electronic device 1102 or the server 1106. The received data may be temporarily stored in the memory 1130, and moreover, may be saved in at least one of the memory 1130 or a memory device connected to the interface 1170, in accordance with the setting of the electronic device.

The interface 1170 may be provided to allow a specific type of memory device to be inserted therein. Signal terminals provided on the interface 1170 may be electrically connected to contact terminals, which are provided depending on a type of the inserted memory device.

Figure 10:
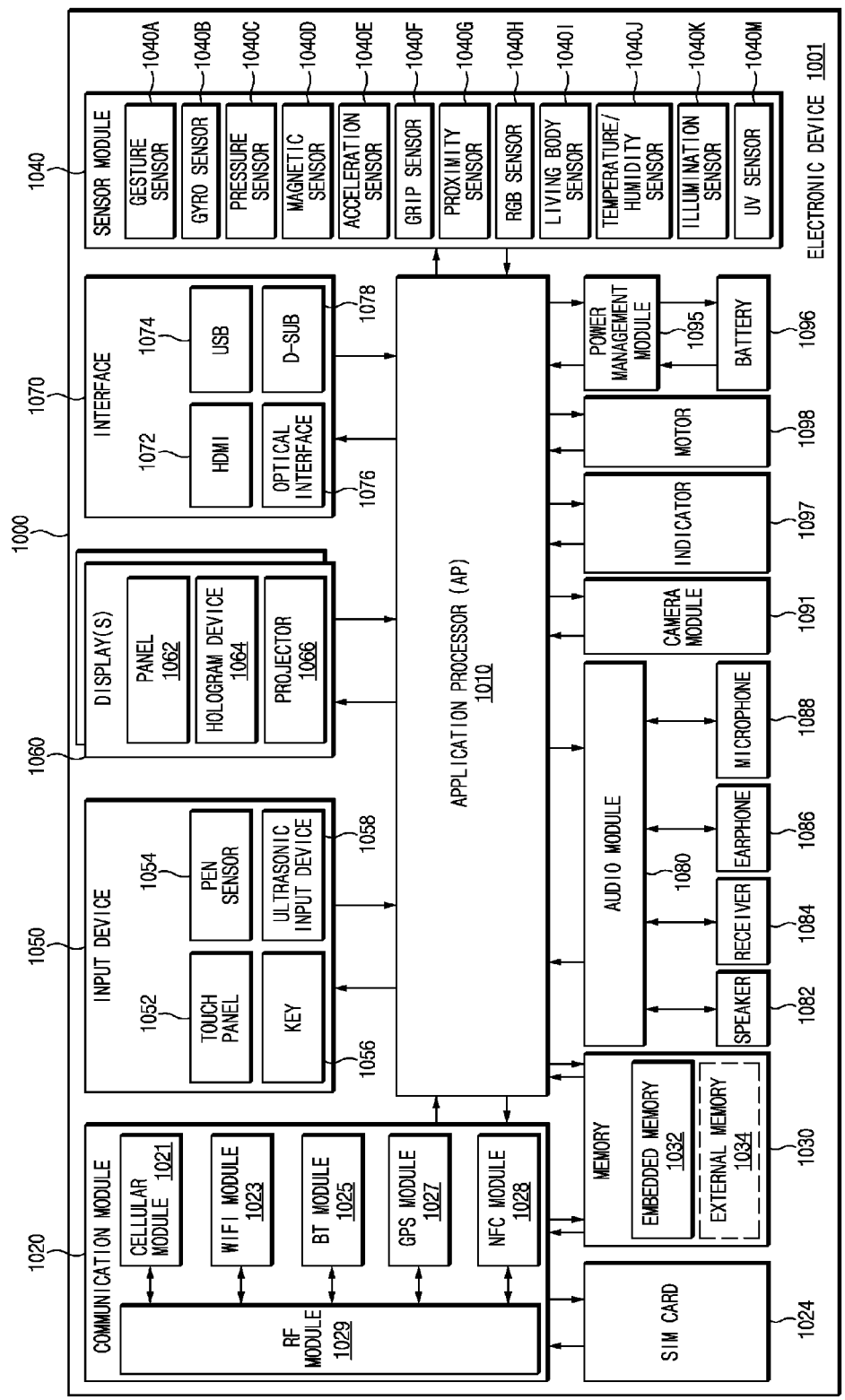
FIG. 10 is a block diagram of an example of an electronic device, according to an embodiment of the present disclosure.

FIG. 10 is a block diagram illustrating an example of an electronic device supporting initialization of a memory device according to an embodiment of the present disclosure.

An electronic device 1001 may be used as a part or all of components of an electronic device 100 or 1100 shown in FIG. 1 or 9. Referring to FIG. 10, the electronic device 1001 may include at least one application processors (AP) 1010, a communication module 1020, a subscriber identification module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010 may drive an operating system (OS) or an application to control a plurality of hardware or software components connected to the AP 1010 and may process and compute a variety of data including multimedia data. The AP 1010 may be implemented with, for example, a System on Chip (SoC). According to an embodiment of the present disclosure, the AP 1010 may further include a graphic processing unit (GPU) (not shown). According to various embodiments, the AP 1010 may identify a type of a memory device, which is connected through the interface described with reference to FIGS. 1 through 9 and operate the memory device. In this regard, the AP 1010 may include a controller or a processor supporting operations depending on the type of the memory device type. If the type of the memory device is determined, the AP 1010 may assign a controller associated with operations of the memory device.

The communication module 1020 may perform a data transmission/receipt through communication between other electronic devices connected with the electronic device 1001 (e.g., the electronic device 100 or 1100) through a network. The communication module 1020 may transmit data received from other electronic devices to the memory 1030, under the control of the AP 1010. Alternatively, the communication module 1020 may transmit data stored in the memory 1030 to other electronic device, under the control of the AP 1010.

According to an embodiment of the present disclosure, the communication module 1020 may include a cellular module 1021, a wireless-fidelity (Wi-Fi) module 1023, a Bluetooth (BT) module 1025, a global positioning system (GPS) module 1027, a near-field communication (NFC) module 1028, and a radio frequency (RF) module 1029.

The cellular module 1021 may provide voice communication, video communication, a character service, an Internet service, or the like through a communication network (e.g., an LTE, an LTE-A, a CDMA, a WCDMA, a UMTS, a WiBro, a GSM, or the like). Also, the cellular module 1021 may perform discrimination and authentication of an electronic device within a communication network using, for example, a subscriber identification module (e.g., a SIM card 1024). According to an embodiment of the present disclosure, the cellular module 1021 may perform at least a portion of functions that the AP 1010 provides. For example, the cellular module 1021 may perform at least a portion of a multimedia control function.

According to an embodiment of the present disclosure, the cellular module 1021 may include a communication processor (CP). Also, the cellular module 1021 may be implemented with, for example, a SoC. While components such as the cellular module 1021 (e.g., a communication processor), the memory 1030, the power management module 1095, or the like are illustrated in FIG. 10 to be components independent of the AP 1010, the AP 1010 may be implemented to include at least a portion (e.g., a cellular module 1021) of the above components.

According to an embodiment of the present disclosure, the AP 1010 or the cellular module 1021 (e.g., a communication processor) may load and process an instruction or data received from nonvolatile memories respectively connected thereto or from at least one of other elements at the nonvolatile memory. Also, the AP 1010 or the cellular module 1021 may store data received from at least one of other elements or generated by at least one of other elements at a nonvolatile memory.

Each of the Wi-Fi module 1023, the BT module 1025, the GPS module 1027, and the NFC module 1028 may include, for example, a processor for processing data exchanged through a corresponding module. Although, in FIG. 10, the cellular module 1021, the Wi-Fi module 1023, the BT module 1025, the GPS module 1027, and the NFC module 1028 are illustrated as separate blocks, but according to an embodiment of the present disclosure, at least a portion (e.g., two or more components) of the cellular module 1021, the Wi-Fi module 1023, the BT module 1025, the GPS module 1027, and the NFC module 1028 may be included within one Integrated Circuit (IC) or an IC package. For example, at least a portion (e.g., a communication processor corresponding to the cellular module 1021 and a Wi-Fi processor corresponding to the Wi-Fi module 1023) of communication processors corresponding to the cellular module 1021, the Wi-Fi module 1023, the BT module 1025, the GPS module 1027, and the NFC module 1028 may be implemented with one SoC.

The RF module 1029 may transmit and receive data, for example, an RF signal. Though not shown, the RF module 1029 may include a transceiver, a power amplifier module (PAM), a frequency filter, or low noise amplifier (LNA). Also, the RF module 1029 may further include the following part for transmitting and receiving an electromagnetic wave in a space in wireless communication: a conductor or a conducting wire. In FIG. 10, an embodiment of the present disclosure is exemplified as the cellular module 1021, the Wi-Fi module 1023, the BT module 1025, the GPS module 1027, and the NFC module 1028 are implemented to share one RF module 1029, but according to an embodiment of the present disclosure, at least one of the cellular module 1021, the Wi-Fi module 1023, the BT module 1025, the GPS module 1027, or the NFC module 1028 may transmit and receive an RF signal through a separate RF module.

The SIM card 1024 may be a card that includes a subscriber identification module and may be inserted to a slot formed at a specific position of the electronic device. The SIM card 1024 may include unique identify information (e.g., integrated circuit card identifier (ICCID)) or subscriber information (e.g., integrated mobile subscriber identify (IMSI)). According to an embodiment of the present disclosure, the SIM card 1024 may be a part of the memory device 180. If the SIM card 1024 is inserted into the slot, the AP 1010 may perform an operation for initializing the SIM card 1024.

The memory 1030 (e.g., the memory 130) may include an embedded memory 1032 or an external memory 1034. For example, the embedded memory 1032 may include at least one of a volatile memory (e.g., dynamic RAM (DRAM), static RAM (SRAM), synchronous dynamic RAM (SDRAM), or the like), or a nonvolatile memory (e.g., one-time programmable ROM (OTPROM), programmable ROM (PROM), erasable and programmable ROM (EPROM), electrically erasable and programmable ROM (EEPROM), mask ROM, flash ROM, NAND flash memory, or NOR flash memory). According to an embodiment of the present disclosure, the embedded memory 1032 may be a Solid State Drive (SSD).

The external memory 1034 may further include a flash drive, for example, a compact flash (CF), a secure digital (SD), a micro-secure digital (SD), a mini-SD, an extreme Digital (xD), a memory stick, or the like. The external memory 1034 may be functionally connected with the electronic device 1001 through various interfaces. According to an embodiment of the present disclosure, the electronic device 1001 may further include storage (or storage medium) such as a hard disk drive.

The sensor module 1040 may measure a physical quantity or may detect an operation state of the electronic device 1001, and moreover, may convert the measured or detected information to an electrical signal. The sensor module 1040 may include at least one of a gesture sensor 1040A, a gyro sensor 1040B, a pressure sensor 1040C, a magnetic sensor 1040D, an acceleration sensor 1040E, a grip sensor 1040F, a proximity sensor 1040G, a color sensor 1040H (e.g., RGB sensor), a living body sensor 1040I, a temperature/humidity sensor 1040J, an illuminance sensor 1040K, or an UV sensor 1040M. Additionally or alternatively, though not shown, the sensor module 140 may further include an E-nose sensor, an electromyography sensor (EMG) sensor, an electroencephalogram (EEG) sensor, an electrocardiogram (ECG) sensor, a photoplethysmographic (PPG) sensor, an infrared (IR) sensor, an iris sensor, or a fingerprint sensor, for example. The sensor module 1040 may further include a control circuit for controlling at least at least one sensors included therein.

The input device 1050 may include a touch panel 1052, a (digital) pen sensor 1054, a key 1056, or an ultrasonic input unit 1058. The input device 1050 may generate an input signal associated with the initialization of the memory device 180 (e.g., associated with operations for turning on and off the electronic device 1001). According to an embodiment of the present disclosure, the AP 1010 may allocate icon, key, or the like, allowing for generation of an input signal associated with the initialization of the memory device 180.

The touch panel 1052 may recognize a touch input using at least one of a capacitive type, a resistive type, an infrared type, or an ultrasonic wave type. Also, the touch panel 1052 may further include a control circuit. In case of the capacitive type, a physical contact or proximity recognition is possible. The touch panel 1052 may further include a tactile layer. In this case, the touch panel 8112 may provide a tactile reaction to a user.

The (digital) pen sensor 1054 may be implemented, for example, using a method, which is the same as or similar to receiving a user touch input, or using a separate sheet for recognition. The key 1056, for example, may include a physical button, an optical key, or a keypad. The ultrasonic input unit 858 may be a device, which allows the electronic device 1001 to detect a sound wave using a microphone (e.g., a microphone 1088) and to determine data through an input tool generating an ultrasonic signal, and enables wireless recognition. According to an embodiment of the present disclosure, the electronic device 1001 may receive a user input from an external unit (e.g., a computer or a server) connected thereto using the communication module 1020.

The display 1060 (e.g., a display 150) may include a panel 1062, a hologram device 1064, or a projector 1066. The panel 1062 may be a liquid-crystal display (LCD) or an active-matrix organic light-emitting diode (AMOLED). The panel 1062, for example, may be implemented to be flexible, transparent, or wearable. The panel 1062 and the touch panel 1052 may be implemented with one module. The hologram device 1064 may show a three-dimensional image in a space using interference of light. The projector 1066 may project light onto a screen to display an image. The screen, for example, may be positioned in the inside or outside of the electronic device 1001. According to an embodiment of the present disclosure, the display 1060 may further include a control circuit for controlling the panel 1062, the hologram device 1064, or the projector 1066.

The interface 1070, for example, may include a high-definition multimedia interface (HDMI) 1072, a universal serial bus (USB) 1074, an optical interface 1076, or a D-subminiature (D-sub) 1078. The interface 1070 may include, for example, the interface 170 illustrated in FIG. 1. Additionally or alternatively, the interface 1070 may include, for example, a mobile high definition link (MHL) interface, a SD card/multi-media card (MMC) interface, or an infrared data association (IrDA) standard interface.

The audio module 1080 may convert a sound and an electrical signal in dual directions. The audio module 1080, for example, may process sound information that is input or output through a speaker 1082, a receiver 1084, an earphone 1086, a microphone 1088, or the like. According to an embodiment of the present disclosure, the audio module 1080 may output an audio signal guiding the insertion and extraction operations of the memory device 180. The audio module 1080 may output announcement sound associated with operations of the memory device 180. The outputting of the audio signal may be omitted, in accordance with a setting of the electronic device.

The camera module 1091 may be a device that shoots a still picture and a moving picture, and according to an embodiment of the present disclosure, the camera module 1091 may include at least one image sensors (e.g., a front sensor or a rear sensor), a lens (not shown), an image signal processor (ISP) (not shown), or a flash (not shown) (e.g., an LED or a xenon lamp). The image data obtained by the camera module 1091 may be stored in the memory device 180, under the control of the AP 1010.

The power management module 1095 may manage power of the electronic device 1001. For example power management module 1095 may control the supply electric power associated with at least one of memory operations of the memory device 180. If the memory device 180 is extracted, the power management module 1095 may cut off the electric power associated with an operation of a corresponding memory. The power management module 1095 may supply the electric power required for an initialization operation of the electronic device 1001. Though not shown, the power management module 1095, for example, may include a power management integrated circuit (PMIC) a charger IC, or a battery or fuel gauge.

The PMIC, for example, may be embedded in an IC or a SoC semiconductor. A charging method may be classified as a wired method or a wireless method. The charger IC may charge a battery and may prevent an overvoltage or an overcurrent from being input from a charger. According to an embodiment of the present disclosure, the charger IC may include a charger IC for at least one of a wired charging method and a wireless charging method. The wireless charging method, for example, may be a magnetic resonance method, a magnetic induction method, or an electromagnetic method, and an additional circuit for wireless charging, for example, circuits such as a coil loop, a resonance circuit, or a rectifier may be further provided.

A battery gauge, for example, may measure a remnant of the battery 1096, a voltage, a current, or a temperature during charging. The battery 1096 may store or generate electricity and may supply power to the electronic device 1001 using the stored or generated electricity. The battery 1096, for example, may include a rechargeable battery or a solar battery.

The indicator 1097 may display the following specific state of the electronic device 1001 or a portion (e.g., the AP 1010) thereof: a booting state, a message state, or a charging state. The motor 1098 may convert an electrical signal to mechanical vibration. Though not shown, the electronic device 1001 may include a processing unit (e.g., a GPU) for supporting a mobile TV. The processing unit for supporting the mobile TV, for example, may process media data that is based on the standard of digital multimedia broadcasting (DMB), digital video broadcasting (DVB), media flow, or the like.

Each of the above components of the electronic device according to an embodiment may be implemented using at least one components, and a name of a relevant component may vary with on the kind of the electronic device. The electronic device according to various embodiments may include at least one of the above components, and a portion of the components may be omitted, or additional other components may be further included. Also, some of the components of the electronic device according to the present disclosure may be combined to form one entity, thereby making it possible to perform the functions of the relevant components substantially the same as before the combination.

The term "module" used for the present disclosure, for example, may mean a unit including one of hardware, software, and firmware or a combination of two or more thereof A "module", for example, may be interchangeably used with terminologies such as a unit, logic, a logical block, a component, and a circuit. The "module" may be a minimum unit of a component integrally configured or a portion thereof The "module" may be a minimum unit performing at least one functions or a portion thereof The "module" may be implemented mechanically or electronically. For example, the "module" according to the present disclosure may include at least one of an Application-Specific Integrated Circuit (ASIC) chip performing certain operations, a Field-Programmable Gate Arrays (FPGAs), or a programmable-logic device, known or to be developed in the future.

According to various embodiments, at least a portion of an apparatus (e.g., modules or functions thereof) or a method (e.g., operations) according to various embodiments, for example, may be implemented by instructions stored in a computer-readable storage media in the form of a programmable module. The instruction, when executed by at least one processors (e.g., the processor 120), may perform a function corresponding to the instruction. The computer-readable storage media, for example, may be the memory 130. At least a portion of the programming module, for example, may be implemented (e.g., executed) by the processor 1120 or the host controller 120. At least a portion of the programming module may include the following for performing at least one functions: a module, a program, a routine, a set of instructions, or a process.

A computer-readable recording medium may include a hard disk, a magnetic media such as a floppy disk and a magnetic tape, an optical media such as compact disc Read Only Memory (CD-ROM) and a digital versatile disc (DVD), a magneto-optical media such as a floptical disk, and the following hardware devices specifically configured to store and perform a program instruction (e.g., a programming module): Read Only Memory (ROM), Random Access Memory (RAM), and a flash memory. Also, a program instruction may include not only a mechanical code such as things generated by a compiler but also a high-level language code executable on a computer using an interpreter. The above hardware unit may be configured to operate via at least one software modules for performing an operation of the present disclosure, and vice versa.

According to various embodiments of the present disclosure, a computer-readable storage media according to an embodiment may include at least one instruction stored in a memory, the instruction may be prepared to perform an operation of receiving a plurality of electrical signals, which may be changed by insertion of a memory device or may be the same as its previous state, an operation of determining a type of the memory device based on the plurality of electrical signals, and an operation of controlling operations of the memory device based on the type of the memory device.

In various embodiments of the present disclosure, the computer-readable storage media may store an instruction prepared to perform an operation of receiving an electrical signal corresponding to insertion and extraction of the memory device, and an operation of receiving an electrical signal, whose state is dependent on the type of the memory device.

In various embodiments of the present disclosure, the computer-readable storage media may store an instruction prepared to perform an operation of activating a first device driver, which is associated with operations of a first-type memory device, based on the electrical signal depending on the insertion and extraction of the memory device, and an operation of inactivating the first device driver activated or of maintaining the activated state of the first device driver, based on the electrical signal, whose state is dependent on the type of the memory device.

In various embodiments of the present disclosure, the computer-readable storage media may store an instruction prepared to perform an operation of activating a second device driver, which is associated with operations of a second-type memory device, based on the electrical signal having a state dependent on the type of the memory device.

A module or a programming module according to an embodiment may include at least one of the above elements, or a portion of the above elements may be omitted, or additional other elements may be further included. Operations performed by a module, a programming module, or other elements according to an embodiment may be executed sequentially, in parallel, repeatedly, or in a heuristic method. Also, a portion of operations may be executed in different sequences, omitted, or other operations may be added.

The terms "include," "comprise," and "have", or "may include," or "may comprise" and "may have" used herein indicate disclosed functions, operations, or existence of elements but does not exclude other functions, operations or elements. Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

The meaning of the term "or" used herein includes any or all combinations of the words connected by the term "or". For instance, the expression "A or B" may indicate include A, B, or both A and B. As used herein, the term "and/or" includes any and all combinations of at least one of the associated listed items.

The terms such as "1st", "2nd", "first", "second", or the like used herein may refer to modifying various different elements of various embodiments, but do not limit the elements. For instance, such terms do not limit the order and/or priority of the elements. Furthermore, such terms may be used to distinguish one element from another element. For instance, both "a first user device" and "a second user device" indicate a user device but indicate different user devices from each other For example, a first component may be referred to as a second component and vice versa without departing from the scope of the present disclosure.

In the description below, when one part (or element, device, etc.) is referred to as being "connected" to another part (or element, device, etc.), it should be understood that the former can be "directly connected" to the latter, or "electrically connected" to the latter via an intervening part (or element, device, etc.). It will be further understood that when one component is referred to as being "directly connected" or "directly linked" to another component, it means that no intervening component is present.

Terms used in this specification are used to describe embodiments of the present disclosure and are not intended to limit the scope of the present disclosure. The terms of a singular form may include plural forms unless otherwise specified.

Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal sense unless expressly so defined herein in various embodiments of the present disclosure.

An electronic device according to various embodiments may be a device including a memory interface. For instance, electronic devices may include at least one of smartphones, tablet personal computers (PCs), mobile phones, video phones, electronic book (e-book) readers, desktop PCs, laptop PCs, netbook computers, personal digital assistants (PDAs), portable multimedia players (PMPs), Moving Picture Experts Group Audio Layer 3 (MP3) players, mobile medical devices, cameras, wearable devices (e.g., head-mounted-devices (HMDs), such as electronic glasses), electronic apparel, electronic bracelets, electronic necklaces, electronic appcessory, electronic tattoos, smart watches, or the like.

According to various embodiments, an electronic device may be smart home appliances having a communication function. The smart home appliances may include at least one of, for example, televisions (TVs), digital video disk (DVD) players, audio devices, refrigerators, air conditioners, cleaners, ovens, microwave ovens, washing machines, air cleaners, set-top boxes, TV boxes (e.g., Samsung HomeSync™, Apple TV™ or Google TV™), game consoles, electronic dictionaries, electronic keys, camcorders, electronic picture frames, or the like.

According to various embodiments, the electronic devices may include at least one of medical devices (e.g., a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), and points of sales (POSs) including metal cases.

According to various embodiments, the electronic devices may include at least one of parts of furniture or buildings/structures having communication functions, electronic boards, electronic signature receiving devices, projectors, and measuring instruments (e.g., water meters, electricity meters, gas meters, and wave meters) including metal cases. The electronic devices according to various embodiments may be at least one combinations of the above-mentioned devices. Furthermore, the electronic devices according to various embodiments may be flexible devices. It would be obvious to those skilled in the art that the electronic devices according to various embodiments are not limited to the above-mentioned devices.

According to various embodiments, it is possible to properly determine whether a memory device is inserted and extracted, regardless of a type of the memory device.

Accordingly, the use of the memory interface according to various embodiments may allow an inserted memory device to normally perform its operations.

FIGS. 1-12 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

Although the above-described aspects of the present disclosure are presented in the context of memory interfaces, it is to be understood that the principles and concepts described herein can apply to any suitable type of interface. Thus, although the interfaces 170, 700, and 800 are memory interfaces in the above-described embodiments, in other implementations they may be interfaces operable to receive other types of hardware, such as WiFi adapters, and/or interfaces compatible with many different types of hardware, etc. To that end, although in the above-described embodiments the switching units 720 and 820 are used to distinguish between different species of the same type of device (e.g., a memory device), in other embodiments the switching units may be used to distinguish between different types of devices (e.g., between memory devices and WiFi adapters). Although in the above-described example are presented in the context of card-type memory devices, it is to be understood that any suitable type of memory device may be used.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An interface comprising:
   a receptacle arranged to receive a first-type memory device or a second-type memory device;
   a detection signal line arranged to transmit an electrical signal identifying a type of the memory device;
   a dome-type switch unit coupled to the detection signal line, wherein a state of the switch unit is changed or maintained depending on the type of the memory device; and
   an insertion/extraction supporting device comprised a spring device and a device latch connected to the spring device and arranged to be actuated when the memory device is inserted in the receptacle, the device latch further actuates the switch unit so that two electrical contacts of the switch unit are in contact in absence of the memory device in the receptacle, wherein:

when the first-type memory device is inserted in the receptacle, a protruding portion of the first-type memory device maintains actuation of the switch unit, and when the second-type memory device is inserted in the receptacle, the second-type memory device does not cover the switch unit so that actuation of the switch unit is released and the two electrical contacts of the switch unit are no longer in contact.

2. The interface of claim 1, further comprising at least one signal terminal arranged to be electrically coupled to at least one contact terminal formed on the memory device when the memory device is inserted in the receptacle.

3. The interface of claim 2, wherein the at least one signal terminal is coupled to the detection signal line.

4. The interface of claim 1, wherein the device latch is moved along forward and backward directions parallel to a longitudinal direction of the receptacle when the memory device is inserted in the receptacle or extracted from the receptacle.

5. An electronic device comprising:

a controller;

an interface configured to feed to the controller an electrical signal identifying a type of a memory device that is inserted in the interface, wherein the controller is configured to identify the type of the memory device based on the signal;

a detection signal line coupled to the controller to the interface and arranged to transmit an electrical signal identifying the type of the memory device;

a dome-type switch unit coupled to the detection signal line, wherein a state of the switch unit is changed or maintained depending on the type of the memory device; and an insertion/extraction supporting device comprised a spring device and a device latch connected to the spring device and arranged to be actuated when the memory device is inserted in the interface, the device latch actuates the switch unit so that two electrical contacts of the switch unit are in contact in absence of the memory device in the interface, wherein:

when a first-type memory device is inserted in the interface, a protruding portion of the first-type memory device maintains actuation of the switch unit, and when a second-type memory device is inserted in the interface, the second-type memory device does not cover the switch unit so that actuation of the switch unit is released and the two electrical contacts of the switch unit are no longer in contact.

6. The device of claim 5, wherein the device latch is moved along forward and backward directions parallel to a longitudinal direction of the interface when the memory device is inserted in the interface or extracted from the interface.

7. The electronic device of claim 5, further comprising a memory storing a device driver for operating the memory device, wherein the controller is configured to activate or deactivate the device driver based on the signal.

8. The electronic device of claim 5, further comprising a memory storing a first device driver and a second device driver, wherein the first device driver is activated in accordance with an electric state changed by insertion of the memory device and is maintained in an activated state or is inactivated, based on an electric state of the switch unit, and wherein the second device driver is activated or is maintained in an inactivated state, based on the electric state of the switch unit.

9. A method for operating an electronic device, comprising:

receiving a first signal indicating whether a first-type memory device or a second-type memory device is inserted in an interface;

receiving a second signal identifying the type of the memory device, wherein the identification comprises:

a device latch of an insertion/extraction supporting device actuating a dome-type switch unit so that two electrical contacts of the switch unit are in contact in absence of the memory device in the interface;

identifying that the first-type memory device is inserted in the interface when the insertion/extraction supporting device is actuated so that the insertion/extraction supporting device is not in contact with a switch unit and a protruding portion of the first-type memory device is in contact with the switch unit to maintain actuation of the switch unit, and identifying that the second-type memory device is inserted in the interface when the insertion/extraction supporting device is actuated so that the insertion/extraction supporting device is not in contact with the switch unit and the second-type memory device is not covering the switch unit so that actuation of the switch unit is released and the two electrical contacts of the switch unit are no longer in contact; and controlling an operation of the inserted memory device in accordance with the type of the memory device.

10. The method of claim 9, further comprising:

activating a device driver for operating the first-type memory device based on the first signal; and deactivating the device driver in response to the second signal indicating that the inserted memory device is the second-type memory device.

11. The method of claim 9, further comprising activating a device driver for operating the memory device based on the second signal.

* * * * *